US011988979B2

(12) United States Patent
Taniguchi et al.

(10) Patent No.: US 11,988,979 B2
(45) Date of Patent: May 21, 2024

(54) IMAGE FORMING APPARATUS WITH DEVELOPING MEMBER THAT SUPPLIES TONER TO SURFACE OF IMAGE BEARING MEMBER TO FORM TONER IMAGE

(71) Applicant: CANON KABUSHIKI KAISHA, Tokyo (JP)

(72) Inventors: Hisashi Taniguchi, Shizuoka (JP); Bunro Noguchi, Shizuoka (JP); Shinichi Agata, Shizuoka (JP); Kodai Hayashi, Shizuoka (JP); Keitaro Nakata, Shizuoka (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/940,197

(22) Filed: Sep. 8, 2022

(65) Prior Publication Data

US 2023/0091090 A1 Mar. 23, 2023

(30) Foreign Application Priority Data

Sep. 13, 2021 (JP) ................................ 2021-148441
Jun. 6, 2022 (JP) ................................ 2022-091485

(51) Int. Cl.
*G03G 15/08* (2006.01)

(52) U.S. Cl.
CPC ................................ *G03G 15/0894* (2013.01)

(58) Field of Classification Search
CPC .................................................. G03G 15/0894
See application file for complete search history.

(56) References Cited

U.S. PATENT DOCUMENTS 5,708,921 A * 1/1998 Yagi .................. G03G 15/0898 399/98
9,696,663 B2 7/2017 Noguchi et al.
9,778,583 B2 10/2017 Terauchi et al.
10,372,077 B2 8/2019 Iwasawa et al.
11,333,992 B2 5/2022 Noguchi et al.
2003/0063928 A1* 4/2003 Matsuguma ........... G03G 15/01 399/299

(Continued)

FOREIGN PATENT DOCUMENTS

JP 2003-021965 A 1/2003
JP 2007-011111 A 1/2007

(Continued)

*Primary Examiner* — Walter L Lindsay, Jr.
*Assistant Examiner* — Andrew V Do
(74) *Attorney, Agent, or Firm* — Venable LLP

(57) ABSTRACT

An image forming apparatus comprising: an image bearing member, a developing member that forms a toner image with a toner including a metal soap having a polarity opposite to that of the toner, a supply member that supplies the toner to the developing member, and a control unit that executes a metal soap supply operation of supplying the metal soap from the developing member to the image bearing member when an operation other than the image forming operation is executed, wherein the metal soap supply operation includes a first mode and a second mode, and a potential difference between the supply member and the developing member, which causes an electrostatic force in the direction from the supply member to the developing member to act on the metal soap, is smaller in the metal soap supply operation in the second mode than in the first mode.

38 Claims, 9 Drawing Sheets

(56) References Cited

U.S. PATENT DOCUMENTS

| | | | | |
|---|---|---|---|---|
| 2015/0093130 | A1* | 4/2015 | Kikuchi | G03G 15/168 399/46 |
| 2020/0409297 | A1* | 12/2020 | Ikada | G03G 15/5037 |

FOREIGN PATENT DOCUMENTS

| | | | |
|---|---|---|---|
| JP | 2016-038591 | A | 3/2016 |
| JP | 2021-006837 | A | 1/2021 |
| JP | 2021-006839 | A | 1/2021 |

* cited by examiner

IMAGE FORMING APPARATUS WITH DEVELOPING MEMBER THAT SUPPLIES TONER TO SURFACE OF IMAGE BEARING MEMBER TO FORM TONER IMAGE

This application claims the benefit of Japanese Patent Application No. 2021-148441, filed on Sep. 13, 2021 and Japanese Patent Application No. 2022-091485, filed on Jun. 6, 2022, which are hereby incorporated by reference herein in its entirety.

BACKGROUND OF THE INVENTION

Field of the Invention

The present invention relates to an image forming apparatus.

Description of the Related Art

Organic photosensitive members have become widespread as electrophotographic photosensitive members (hereinafter, also simply referred to as "photosensitive members") used in electrophotographic image forming apparatuses because such members are advantageous in terms of low cost and high productivity. The photosensitive member is configured by providing a photosensitive layer (organic photosensitive layer) using an organic material as a photoconductive substance (charge generating substance or charge transporting substance) on a support. Since an electrical external force or a mechanical external force is directly applied to the photosensitive member in each of the steps of charging, exposure, development, transfer, and cleaning, durability against the external forces is required. Specifically, durability against scratches and wear on the surface due to these external forces, that is, scratch resistance and wear resistance is required.

However, where the hardness of the surface of the photosensitive member is increased in order to obtain wear resistance, the surface becomes difficult to scrape, and discharge products such as ozone and NOx generated by the discharge on the surface of the photosensitive member due to charging are difficult to remove from the surface of the photosensitive member. As a result, the coefficient of friction on the surface of the photosensitive member becomes high, and a torque becomes high. Where the torque becomes high, a load on a drive motor becomes large, the amount of electric power increases, and it becomes difficult to start the motor. Therefore, it is desirable to suppress the increase in torque. As a method for suppressing the increase in torque of a photosensitive member, Japanese Patent Application Publication No. 2021-6839 describes a method in which a metal soap is included in a developer and the metal soap is supplied from the developer bearing member to the surface of the photosensitive member. Specifically, zinc stearate, which is a metal soap, is supplied to the surface of the photosensitive member by a developer bearing member, and the surface of the photosensitive member is coated with zinc stearate to suppress the adhesion of discharge products.

SUMMARY OF THE INVENTION

However, when the technique of Japanese Patent Application Publication No. 2021-6839 is used in a long-life cartridge, for example, the metal soap supplied to the photosensitive member surface by the end of the service life may be transferred to the charging roller by the photosensitive member to cover the surface of the charging roller. A problem arising when the charging roller coverage is generated is that adequate charging is not performed thereby causing image defects.

An object of the present invention is to suppress image defects caused by a metal soap while suppressing an increase in torque of a photosensitive member in an image forming apparatus using a developer including the metal soap.

An image forming apparatus according to the present invention comprises:

a rotatable image bearing member;

a developing member that supplies a toner to a surface of the image bearing member to form a toner image at a developing portion facing the image bearing member;

a supply member that supplies the toner to the developing member; and a control unit that executes an image forming operation of forming the toner image on a recording material and a metal soap supply operation of supplying a metal soap that is included in the toner and has a polarity opposite to that of the toner to the surface of the image bearing member when an operation other than the image forming operation is executed, wherein an operation mode of the metal soap supply operation includes a first mode and a second mode, and a potential difference that is formed between the supply member and the developing member and causes an electrostatic force in a direction from the supply member to the developing member to act on the metal soap is smaller at the time of executing the metal soap supply operation in the second mode than at the time of executing the metal soap supply operation in the first mode.

An image forming apparatus according to the present invention comprises:

a rotatable image bearing member;

a developing member that supplies a toner to a surface of the image bearing member to form a toner image at a developing portion facing the image bearing member;

a supply member that supplies the toner to the developing member; and a control unit that executes an image forming operation of forming the toner image on a recording material and a metal soap supply operation of coating a metal soap that is included in the toner and has a polarity opposite to that of the toner on the surface of the image bearing member by supplying the toner from the developing member to the surface of the image bearing member when an operation other than the image forming operation is executed, wherein the operation mode of the metal soap supply operation includes a first mode and a second mode, and an amount of the metal soap supplied from the developing member to the surface of the image bearing member is smaller at the time of executing the metal soap supply operation in the second mode than at the time of executing the metal soap supply operation in the first mode.

An image forming apparatus according to the present invention comprises:

a rotatable image bearing member;

a developing member that supplies a toner to a surface of the image bearing member to form a toner image at a developing portion facing the image bearing member; and a control unit that executes an initial operation of causing the image bearing member to make a transition from a new state to a print-ready state and an image forming operation of forming the toner image on a recording material, wherein a first peripheral speed ratio, which is the ratio of a surface movement speed of the developing member to a surface movement speed of the image bearing member in at least a part of a period of time in which the initial operation is executed, is larger than a second peripheral speed ratio, which is a ratio of the surface movement speed of the developing member to the surface movement speed of the image bearing member at the time of executing the image forming operation.

According to the present invention, it is possible to suppress image defects caused by a metal soap while suppressing an increase in torque of a photosensitive member in an image forming apparatus using a developer including the metal soap.

Further features of the present invention will become apparent from the following description of exemplary embodiments with reference to the attached drawings.

DESCRIPTION OF THE EMBODIMENTS

Hereinafter, embodiments of the present invention will be explained with reference to the drawings. The following explanation is exemplary, and the present invention is not limited to the contents thereof. Further, in each of the following figures, the description of components not necessary for the explanation of the embodiment will be omitted as appropriate.

Example 1

1. Image Forming Apparatus

Figure 1:
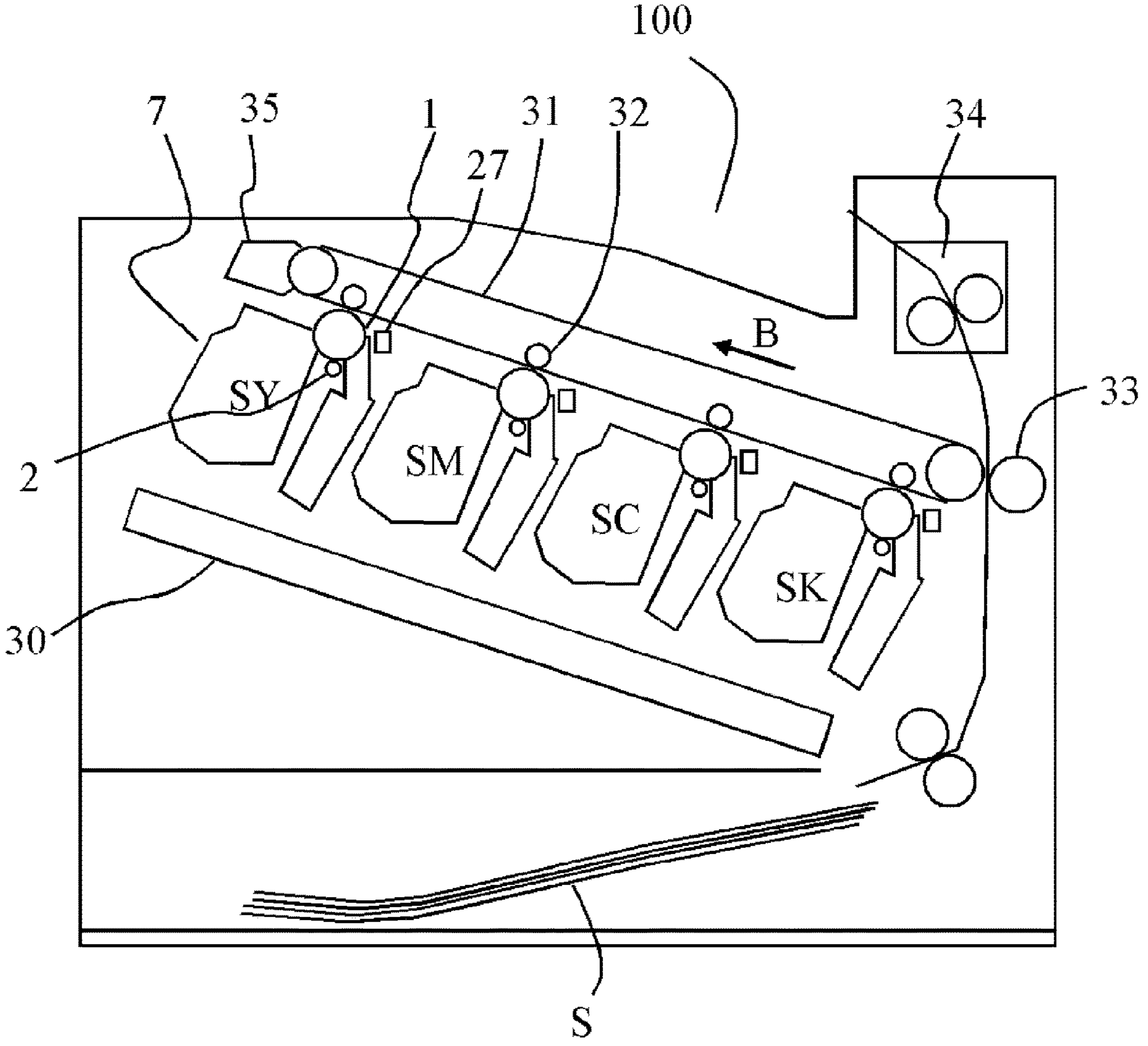
FIG. 1 is a schematic cross-sectional view of an image forming apparatus in Example 1.

The overall configuration of the electrophotographic image forming apparatus in Example 1 will be explained hereinbelow. Here, the image forming apparatus is an apparatus that forms an image on a recording material (recording medium) by using an electrophotographic image forming method. Examples of the image forming apparatus include a copier, a printer (laser beam printer, LED printer, etc.), a facsimile apparatus, a word processor, and devices combining the functions thereof (a multifunction printer and the like). FIG. 1 is a schematic cross-sectional view of an image forming apparatus 100 of Example 1. The image forming apparatus 100 of Example 1 is a full-color laser printer that employs an in-line method and an intermediate transfer method. The image forming apparatus 100 can form a full-color image on a recording material S (for example, recording paper, plastic sheet, cloth, and the like) according to image information. The image information is inputted to the image forming apparatus 100 from an image reading device (not shown) connected to the image forming apparatus 100, or a host device (not shown) such as a personal computer communicably connected to the image forming apparatus 100.

The image forming apparatus 100 has first, second, third, and fourth image forming units SY, SM, SC, and SK for forming an image of each color of yellow (Y), magenta (M), cyan (C), and black (K), respectively, as a plurality of image forming units.

In Example 1, the image forming apparatus 100 has four drum-shaped electrophotographic photosensitive members (hereinafter referred to as photosensitive members) 1 provided as a plurality of image bearing members side by side in a direction intersecting the vertical direction. The photosensitive members 1 and the image forming units (each of SY, SM, SC, and SK) are integrated to form a process cartridge 7.

Figure 2:
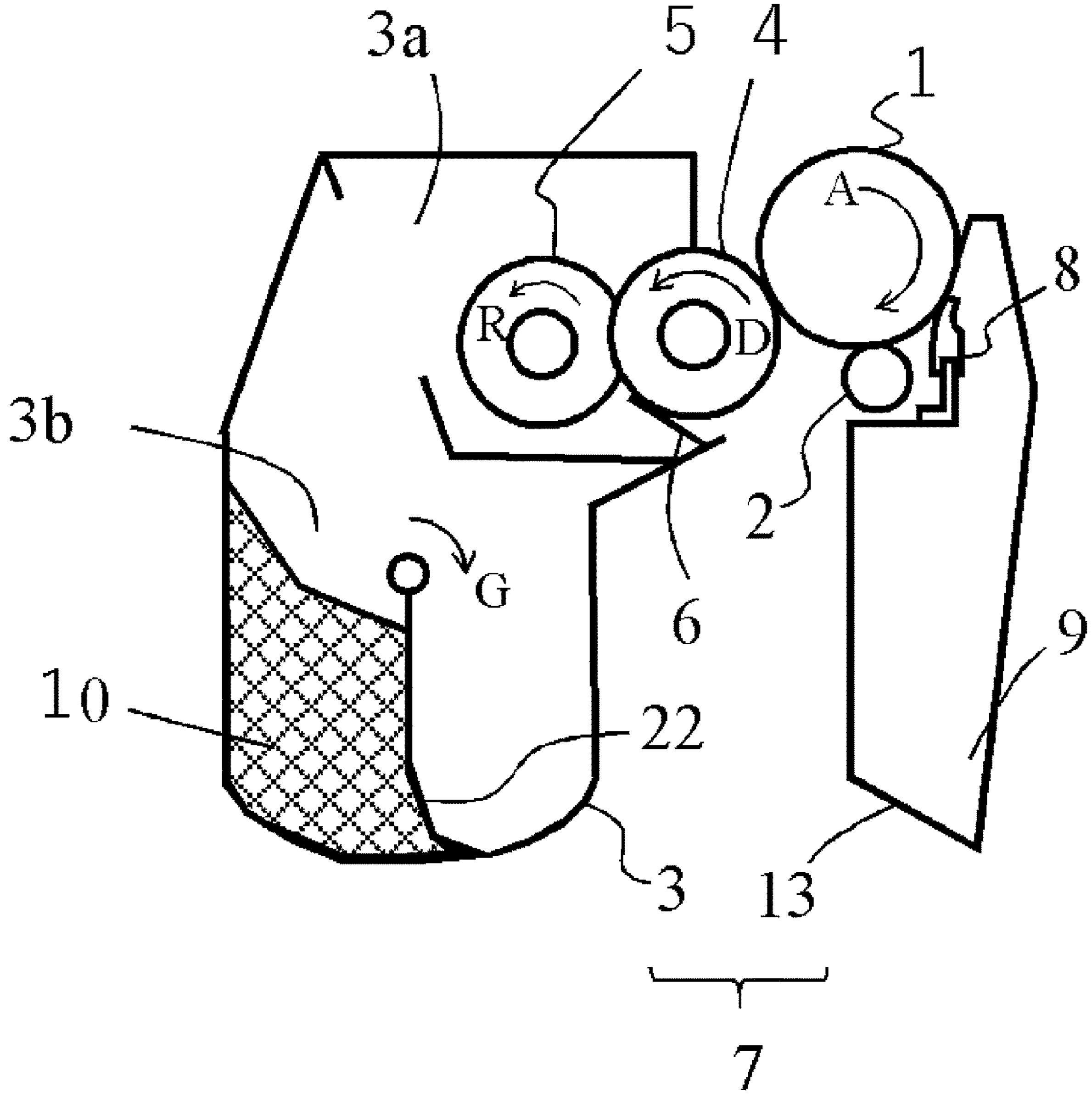
FIG. 2 is a cross-sectional view of a process cartridge in Example 1.

The photosensitive member 1 as an image bearing member that bears an electrostatic latent image is rotationally driven in the direction of arrow A in FIG. 2 by a driving means (not shown). A charging roller 2, which is a charging member, is a single-layer roller composed of a conductive core metal and a conductive rubber layer, and has an outer diameter of (p7.5 mm and a volume resistivity of from $10^3$ Ω·cm to $10^6$ Ω·cm. The surface of the photosensitive member 1 is uniformly charged to −500 V by applying a charging voltage of −1000 V to the charging roller 2 by a charging high voltage 71, which is a charging voltage application unit serving as a high-voltage power source described hereinbelow. A DC (direct current) voltage composed of Vd+Vth is applied to the charging roller 2, and the photosensitive member 1 is uniformly charged with Vd by electric discharge. Here, Vd is the dark potential which is −500 V. Vth is the discharge start voltage, and when the applied charging voltage is small, the surface potential on the photosensitive member 1 does not increase due to the discharge, but the surface potential starts to increase due to the discharge from the discharge start voltage Vth. In other words, the discharge start voltage Vth in Example 1 is −500 V.

After the surface of the photosensitive member 1 is charged by the charging roller 2, the surface of the photosensitive member 1 is irradiated with a laser beam from an exposure unit 30. The exposure unit 30 is an exposure means for irradiating with a laser beam on the basis of image information to form an electrostatic latent image on the surface of the photosensitive member 1. The surface potential of the surface of the photosensitive member 1 irradiated with the laser beam changes to −100 V as Vl, which is the bright potential, and an electrostatic latent image is formed.

FIG. 2 is a cross-sectional view of the process cartridge 7 of Example 1 as viewed in the longitudinal direction (rotational axis direction) of the photosensitive member 1. The process cartridge 7 is configured of a developing unit 3 and a photosensitive member unit 13. A developing roller 4, which is a developing member, and a toner supply roller (hereinafter, referred to as "supply roller") 5, which is a toner supply member, are arranged in the developing unit 3. By receiving the driving force of a drive motor (not shown), the developing roller 4 rotates in the direction of arrow D in FIG. 2, and the supply roller 5 rotates in the direction of arrow R in FIG. 2. Where a voltage of −300 V is applied as a developing voltage to the developing roller 4 from a developing high voltage 72 as the developing voltage application portion, a developer (toner) is supplied by the developing roller 4 to the electrostatic latent image formed on the surface of the photosensitive member 1, that is, the above Vl portion, and development is performed.

The developer image (toner image) developed on the surface of the photosensitive member 1 is transferred to an intermediate transfer belt 31 shown in FIG. 1. The intermediate transfer belt 31 is an intermediate transfer member capable of coming into contact with and separating from each of the photosensitive members 1 of the image forming units SY, SM, SC, and SK, and is formed of an endless belt that faces the photosensitive members 1 and serves for transferring the toner image on the photosensitive member 1 to the recording material S. The intermediate transfer belt 31 comes into contact with the photosensitive members 1 of the image forming units SY, SM, SC, and SK, and circulates (rotates) in the direction of arrow B (counterclockwise) in FIG. 1.

On the inner peripheral surface side of the intermediate transfer belt 31, a primary transfer roller 32, which is a transfer member, is arranged so as to face the photosensitive members 1 of the image forming units SY, SM, SC, and SK with the intermediate transfer belt 31 interposed therebetween. A voltage having a polarity opposite to the regular charging polarity of the toner is applied to the primary transfer roller 32 from a primary transfer voltage power supply (primary transfer high voltage) 73. As a result, the toner image on the photosensitive member 1 is transferred (primary transfer) onto the intermediate transfer belt 31. As for the polarity of the toner in Example 1, the regular polarity is negative. Therefore, the primary transfer can be performed by applying a positive voltage as the primary transfer voltage.

A secondary transfer roller 33 as a secondary transfer means is arranged on the outer peripheral surface side of the intermediate transfer belt 31. A voltage having a polarity opposite to that of the toner is applied to the secondary transfer roller 33 from a secondary transfer voltage power supply (secondary transfer high voltage) 74 as a secondary transfer voltage application unit. As a result, the toner image on the intermediate transfer belt 31 is transferred (secondary transfer) to the recording material S. At the time of full-color image formation, the above-described process is sequentially performed in the image forming units SY, SM, SC, and SK, and the toner images of each color are sequentially superposed on the intermediate transfer belt 31 and primarily transferred. After that, the recording material S is transported to the secondary transfer unit in synchronization with the movement of the intermediate transfer belt 31. The four-color toner images on the intermediate transfer belt 31 are collectively secondarily transferred onto the recording material S by the action of the secondary transfer roller 33 that is in contact with the intermediate transfer belt 31 with the recording material S interposed therebetween.

The recording material S to which the toner image has been transferred is transported to a fixing device 34. By applying heat and pressure to the recording material S in the fixing device 34, the toner image is fixed on the recording material S, and the recording material S is discharged to the outside of the image forming apparatus 100.

Meanwhile, the surface potential of the photosensitive member 1 after the toner has been transferred to the intermediate transfer belt 31 is non-uniform as a result of the application of the primary transfer voltage. Therefore, the surface potential of the photosensitive member 1 that has become non-uniform due to the previous image formation is uniformly leveled by subjecting the surface of the photosensitive member 1 to whole-surface exposure (whole-surface light irradiation) with a pre-exposure unit 27. The pre-exposure removes the residual charge on the surface of the photosensitive member 1. The pre-exposure unit 27 exposes the surface of a portion of the photosensitive member 1 that is downstream of the contact portion with the intermediate transfer belt 31 in the rotation direction of the photosensitive member 1 and upstream of the charged portion in contact with the charging roller 2 and the photosensitive member 1. An LED, a halogen lamp, or the like can be used as the light source of the pre-exposure unit 27. The light source to be used is not particularly limited, but it is preferable to use an LED from the viewpoint of low drive voltage and easy miniaturization of the apparatus. Therefore, in Example 1, an LED was used as the pre-exposure light source.

The toner that is not transferred to the intermediate transfer belt 31 by the primary transfer roller 32 and remains on the surface of the photosensitive member 1 is scraped off from the surface of the photosensitive member 1 by a cleaning blade 8 in contact with the photosensitive member 1. The scraped-off toner is accommodated in a waste toner storage chamber 9 provided below the cleaning blade 8. The toner that is not transferred to the recording material S by the secondary transfer roller 33 and remains on the intermediate transfer belt 31 is transported to an intermediate transfer member cleaning device 35, which serves as a cleaning device, and removed.

2. Control Mode of Image Forming Apparatus

Figure 3:
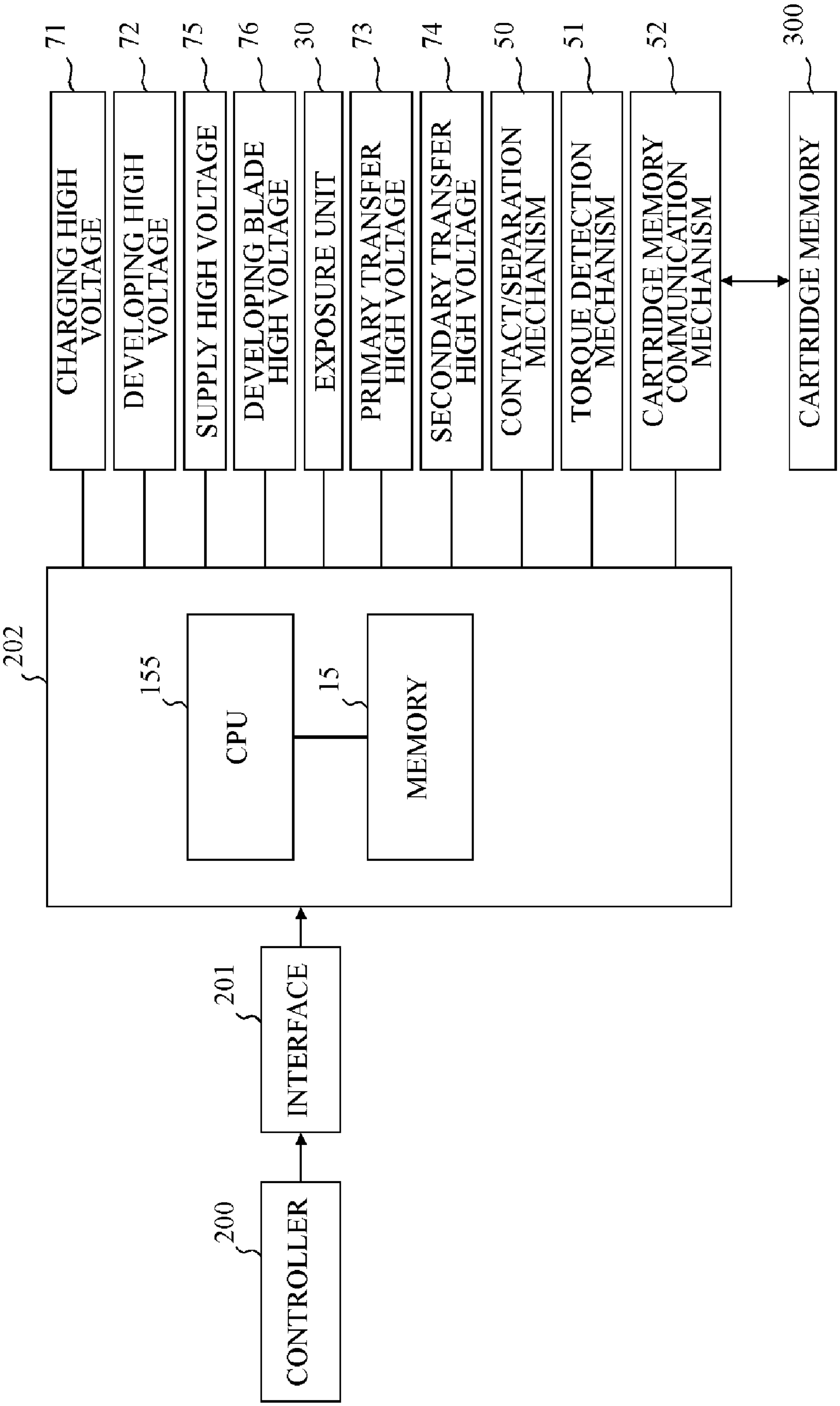
FIG. 3 is a control block diagram of the image forming apparatus in Example 1.

FIG. 3 is a block diagram showing a logical relationship between the components of the image forming apparatus 100 in Example 1. A control unit 202 that controls the operation of the image forming apparatus 100 inputs and outputs signals indicating various types of information via an electrical connection. The control unit 202 processes signals input from various process devices and sensors, and processes signals output to give operation commands to various process devices. A controller 200 inputs and outputs various signals to and from the host device, and inputs and outputs various signals to and from the control unit 202 via an interface 201 to perform comprehensive control of the image forming operation of the image forming apparatus 100 according to a predetermined control program or reference table. The control unit 202 has a CPU 155, which is a central element for performing various types of calculation processing, a memory 15 such as a RAM, a ROM, and the like, which is a storage element, and the like. The RAM stores the detection results of sensor, the count results of a counter, the calculation results, and the like, and the ROM stores the control program, the data table obtained in advance by experiments, and the like. Each control target, sensor, counter, etc. in the image forming apparatus 100 are connected to the control unit 202. The control unit 202 controls the input/output of various signals, the timing of driving each unit, and the like to perform control of a predetermined image formation sequence, and the like. For example, the following high-voltage power sources and devices are controlled to form a toner image on the surface of the photosensitive member 1. The charging high voltage 71 as a charging power source, the developing high voltage 72 as a developing power source, a supply high voltage 75 for supplying a toner supply voltage as a power source for the supply roller 5, a developing blade high voltage 76 as a power source for a toner regulating member 6, the exposure unit 30, etc. are controlled. Further, the primary transfer high voltage 73 as the primary transfer power source, the secondary transfer high voltage 74 as the secondary transfer power source, and the like for forming the toner image on the recording material S are also controlled. In addition, a contact/separation mechanism 50 that controls the contact/separation between the developing roller 4 and the photosensitive member 1, a torque detection mechanism 51 of the drive motor of the photosensitive member 1, and a cartridge memory communication mechanism 52 that records the usage history of the cartridge are controlled. In Example 1, the control unit 202 controls the high voltage and the like in order to perform the metal soap supply operation (coating operation) described in detail hereinbelow.

3. Schematic Configuration of Process Cartridge

The overall configuration of the process cartridge 7 mounted on the image forming apparatus 100 of Example 1 will be described with reference to FIG. 2. The process cartridge 7 can be attached to and detached from the image forming apparatus 100 with a mounting means such as a mounting guide, a positioning member (not shown), and the like provided at the image forming apparatus 100. In Example 1, the process cartridges 7 for each color all have the same shape, and toners 10 of yellow (Y), magenta (M), cyan (C), and black (K) colors are accommodated in the process cartridges 7 for the respective color.

In Example 1, the configuration and operation of the process cartridge 7 for each color are substantially the same, except for the type (color) of the toner 10 accommodated therein.

The process cartridge 7 has the developing unit 3 including the developing roller 4 and the like, and the photosensitive member unit 13 including the photosensitive member 1.

In Example 1, the developing unit 3 and the photosensitive member unit 13 are integrated to form the process cartridge 7, but the process cartridge 7 is not limited to this configuration, and the developing unit 3 and the photosensitive member unit 13 may be detachably attached to the image forming apparatus 100 as a developing cartridge and a photosensitive member cartridge, respectively.

The developing unit 3 is divided into a developing chamber 3*a* and a toner accommodating portion 3*b*. The toner accommodating portion 3*b* is provided with a toner transporting member 22 for transporting the toner 10 to the developing chamber 3*a*, and the toner 10 is transported to the developing chamber 3*a* by the rotation of the toner transporting member in the direction of arrow G in the drawing.

The developing chamber 3*a* is provided with the developing roller 4 as a toner carrying member that comes into contact with the photosensitive member 1 and rotates in the direction of arrow D in the drawing. In Example 1, the developing roller 4 and the photosensitive member 1 rotate so that the surfaces thereof move in the same direction in the developing portion where the two face each other.

Further, the supply roller 5 that supplies the toner 10 transported from the toner accommodating portion 3*b* to the developing roller 4, and the toner regulating member 6 that regulates the coating amount of the toner 10 on the developing roller 4, which is supplied by the supply roller 5, and imparts an electric charge thereto are arranged inside the developing chamber 3*a*.

A voltage from the respective high-voltage power source is independently applied to the developing roller 4, the supply roller 5, and the toner regulating member 6. The toner 10 supplied to the developing roller 4 by the supply roller 5 is triboelectrically charged by friction between the developing roller 4 and the toner regulating member 6, and an electric charge is imparted thereto, and at the same time, the layer thickness thereof is regulated. The regulated toner 10 on the developing roller 4 is transported to the portion facing the photosensitive member 1 by the rotation of the developing roller 4, and the electrostatic latent image on the photosensitive member 1 is developed and visualized as a toner image.

At the time of image formation, the predetermined DC voltage (development voltage: Vdc) applied to the developing roller 4 was set to −300 V. Further, by applying a voltage (supply voltage: Vrs=−350 V) to the supply roller 5, the potential difference (ΔVr) between the supply roller 5 and the developing roller 4 is adjusted, and the amount of the toner 10 supplied to the developing roller 4 is adjusted. In Example 1, ΔVr=Vdc - Vrs was set to +50 V, and the potential was set so that the toner having a negative charging property could easily move from the supply roller 5 to the developing roller 4.

When the electrostatic latent image on the photosensitive member 1 is developed and visualized as a toner image, the developing roller 4 is rotationally driven so as to be in contact with the peripheral surface of the photosensitive member 1. This is to facilitate the supply of the metal soap externally added to the toner, which will be described hereinbelow, onto the photosensitive member 1. The structure is not limited to that in which the developing roller 4 and the photosensitive member 1 are in contact with each other as long as the metal soap can be supplied.

Here, in the following description, with respect to the potential and the applied voltage, a large absolute value on the negative polarity side (for example, −1000 V with respect to −500 V) is referred to as a high potential, and a small absolute value on the negative polarity side (for example, −300 V with respect to −500 V) is referred to as a low potential. This is because the toner 10 having a negative charging property in Example 1 is considered as a reference.

Further, the voltage in Example 1 is expressed as a potential difference from the ground potential (0 V). Therefore, the developing voltage =−300 V is interpreted as the presence of a potential difference of −300 V with respect to the ground potential due to the developing voltage applied to the core metal of the developing roller 4. This also applies to other voltages such as charging voltage.

The photosensitive member 1 is rotatably attached to the photosensitive member unit 13 by a bearing (not shown). The photosensitive member 1 is rotationally driven in the direction of arrow A in FIG. 2 by receiving a driving force of a drive motor (not shown). Further, in the photosensitive member unit 13, the charging roller 2 and the cleaning blade 8 as a plate-shaped elastic body are arranged so as to be in contact with the peripheral surface of the photosensitive member 1. One end of the cleaning blade 8 is fixed to a plate-shaped metal sheet, and the other free end is in contact with the photosensitive member 1 to form a cleaning nip which is a contact portion with the photosensitive member 1. The surface of the photosensitive member 1 is rubbed with the cleaning blade 8, and the toner 10 and fine particles remaining in the transfer step are scraped off and stored in the waste toner storage chamber 9. This prevents the toner 10 from adhering to the charging roller 2 and also prevents the photosensitive member 1 from taking the toner 10 away so that an image cannot be formed properly.

4. Configuration of Photosensitive Member

The photosensitive member 1 is composed of a conductive metal support having cylindrical shape, a conductive layer as an undercoat layer of the support, a photosensitive layer (charge generation layer, charge transport layer) formed on the undercoat layer, and a protective layer formed on the photosensitive layer. The photosensitive member 1 is configured by providing a photosensitive material such as OPC (organic optical semiconductor), amorphous selenium, and amorphous silicon on a drum substrate on a cylinder as a support having an outer diameter of φ24 mm and formed of aluminum, nickel, or the like. Further, the photosensitive member 1 in Example 1 is provided with a wear-resistant protective layer on the outermost surface layer in order to improve the wear resistance. By providing the protective layer, durability can be improved.

The protective layer preferably includes conductive particles and/or a charge transport substance and a resin. Examples of the conductive particles include particles of metal oxides such as titanium oxide, zinc oxide, tin oxide, and indium oxide. Examples of the charge transport substance include polycyclic aromatic compounds, heterocyclic compounds, hydrazone compounds, styryl compounds, enamine compounds, benzidine compounds, triarylamine compounds, resins having a group derived from these substances, and the like. Among these, triarylamine compounds and benzidine compounds are preferable.

Examples of the resin include polyester resin, acrylic resin, phenoxy resin, polycarbonate resin, polystyrene resin, phenol resin, melamine resin, epoxy resin, and the like. Of these, polycarbonate resin, polyester resin, and acrylic resin are preferable.

Further, the protective layer may be formed as a cured film by polymerizing a composition including a monomer having a polymerizable functional group.

Examples of the reaction conducted in such a case include a thermal polymerization reaction, a photopolymerization reaction, a radiation polymerization reaction, and the like. Examples of the polymerizable functional group of the monomer having a polymerizable functional group include an acrylic group, a methacrylic group, and the like. As the monomer having a polymerizable functional group, a material having a charge transport ability may be used.

The protective layer may include an additive such as an antioxidant, an ultraviolet absorber, a plasticizer, a leveling agent, a slippery imparting agent, and an abrasion resistance improving agent. Specific examples include hindered phenol compounds, hindered amine compounds, sulfur compounds, phosphorus compounds, benzophenone compounds, siloxane-modified resins, silicone oils, fluororesin particles, polystyrene resin particles, polyethylene resin particles, silica particles, alumina particles, boron nitride particles, and the like. The average film thickness of the protective layer is preferably at least 0.5 μm and not more than 10 μm, and preferably at least 1 μm and not more than 7 μm.

The protective layer can be formed by preparing a coating liquid for a protective layer including the above-mentioned materials and a solvent, forming this coating film, and drying and/or curing. Examples of the solvents suitable for the coating liquid include alcohol-based solvents, ketone-based solvents, ether-based solvents, sulfoxide-based solvents, ester-based solvents, and aromatic hydrocarbon-based solvents. In Example 1, the average film thickness of the protective layer was set to 3 μm.

5. Toner Configuration

Figure 4:
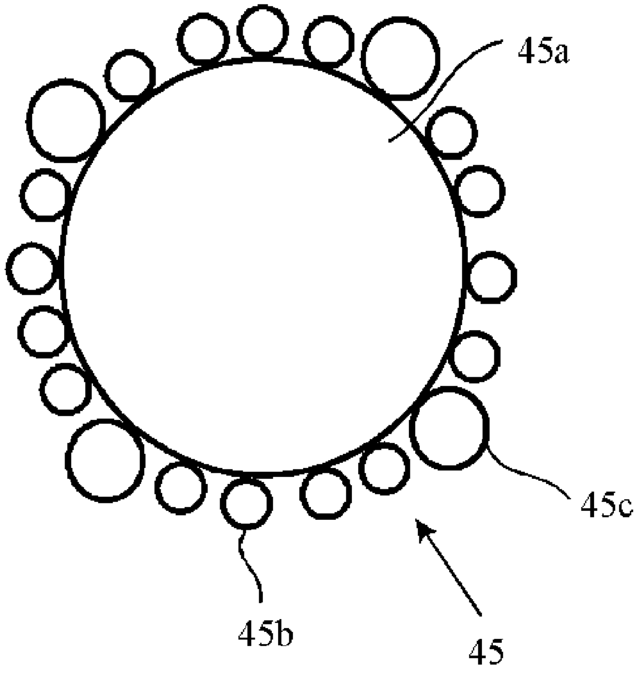
FIG. 4 is a schematic diagram of toner in Example 1.

FIG. 4 shows a schematic diagram of the toner 10 used in Example 1. In Example 1, a toner particle 45 externally added with inorganic particles, which is obtained by externally adding inorganic silicon 45*b* to toner base particles 45*a* to ensure flowability and improve charging performance, is used. The toner used in Example 1 is a non-magnetic one-component granular polymerized toner having a negative charge polarity and an average particle diameter of 7 μm.

Further, for the purpose of reducing the friction coefficient on the surface of the photosensitive member 1, a metal soap 45*c* is externally added in addition to the inorganic silicon 45*b*. The discharge products by nature have high adhesiveness and increase the coefficient of friction of the surface of the photosensitive member 1, but by supplying the metal soap 45*c* to the surface of the photosensitive member 1, it is possible to suppress the adhesion of the discharge products to the surface of the photosensitive member 1 and suppress the increase in the coefficient of friction.

The metal soap 45*c* is a general term for salts of long-chain fatty acids and metals other than sodium and potassium. Specific examples thereof include metal salts of fatty acids such as stearic acid, myristic acid, lauric acid, ricinoleic acid, and octyl acid and metal species such as lithium, magnesium, calcium, barium, and zinc. In Example 1, zinc stearate is externally added as the metal soap 45*c*. The type of metal soap 45*c* is not limited to this, and lead stearate, cadmium stearate, barium stearate, calcium stearate, aluminum stearate, zinc stearate, magnesium stearate, zinc laurate, zinc myristate, and the like may be used, as appropriate, and at least one of these may be selected.

The external addition amount of the metal soap 45*c* is preferably not more than 0.6 wt %. The larger the external addition amount, the more effective it is in suppressing the adhesion of the discharge products to the photosensitive member 1, but where the external addition amount is excessive, the flowability of the toner decreases and the image density in the latter half of the image becomes low. This is a phenomenon called solid image followability reduction, in which the followability decreases as the rear end of the recording material is approached when a solid black image is output. Meanwhile, the external addition amount of the metal soap 45*c* is preferably at least 0.05 wt %. Where the external addition amount is too small, the effect of the metal soap 45*c* is less likely to be exhibited.

The average particle diameter of the metal soap 45*c* is preferably at least 0.15 μm and not more than 2.0 μm. When the average particle diameter of the metal soap 45*c* is smaller than 0.15 μm, it becomes difficult to coat the metal soap on the surface of the photosensitive member 1. This is particularly remarkable when there are grooves on the surface of the photosensitive member 1, which will be described later. Meanwhile, where the particle diameter is larger than 2.0 μm, the particle cannot pass through the toner regulating member 6 or the like in the developing unit 3 and is left behind in the developing chamber 3*a*, and it becomes difficult to supply the toner to the surface of the photosensitive member 1. Hereinafter, a combination of the toner base particles 45*a* and the external additives 45*b* and 45*c* is referred to as a toner.

A method of measuring the average particle diameter of the metal soap 45*c* will be described hereinbelow. A total of 10 mL of ethanol is added to 0.5 g of metal soap 45*c*, and ultrasonic dispersion is performed for 5 min using an ultrasonic disperser manufactured by Nippon Seiki Co., Ltd. Next, ethanol is circulated as a measurement solvent. Then, in a microtrack laser diffraction/scattering type particle size distribution measuring device (SPA type) manufactured by Nikkiso Co., Ltd., the obtained dispersion liquid of metal soap 45*c* is added until a DV (diffraction light amount) value which is a value related to the integrated value of scattered light amount of particles reaches 0.6 to 0.8. Then, the particle size distribution in this state is measured, and the median diameter obtained as the cumulative median diameter, which is a 50% diameter, is taken as the average particle diameter.

The metal soap 45*c* having the above average particle diameter may be produced, for example, by using a double decomposition method in which an aqueous solution of a fatty acid salt and an aqueous solution or a dispersion liquid of an inorganic metal salt are reacted.

In Example 1, zinc stearate having an average particle diameter of 0.60 μm was used. Zinc stearate as the metal soap 45*c* is attached to the toner particle by charging to a polarity opposite to that of the toner particle, and is supplied onto the photosensitive member 1 when an operation other than the image forming operation is executed.

Next, a method for producing toner particles will be described. As a method for producing the toner particles, a known method can be used, and a kneading and pulverizing method or a wet production method can be used. The wet production method is preferable from the viewpoint of uniform particle diameter and shape controllability. Further, as the wet production method, a suspension polymerization method, a dissolution suspension method, an emulsion polymerization and aggregation method, an emulsion and aggregation method, and the like can be used.

In Example 1, the suspension polymerization method is adopted. In the suspension polymerization method, first, a polymerizable monomer for producing a binder resin and other additives such as a colorant, if necessary, are uniformly dissolved or dispersed using a disperser such as a ball mill or an ultrasonic disperser to prepare a polymerizable monomer composition. This step is called a step of preparing a polymerizable monomer composition. At this time, if necessary, a polyfunctional monomer, a chain transfer agent, a wax as a release agent, a charge control agent, a plasticizer, or the like can be added as appropriate. As the polymerizable monomer in the suspension polymerization method, the following vinyl-based polymerizable monomers can be preferably exemplified.

Styrene; styrene derivatives such as α-methyl styrene, O-methyl styrene, o-methyl styrene, m-methyl styrene, p-methyl styrene, 2,4-dimethyl styrene, p-n-butyl styrene, p-tert-butyl styrene, p-n-hexyl styrene, p-n-octyl styrene, p-n-nonyl styrene, p-n-decyl styrene, p-n-dodecyl styrene, p-methoxy styrene, and p-phenyl styrene; acrylic polymerizable monomers such as methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, diethyl phosphate ethyl acrylate, dibutyl phosphate ethyl acrylate, 2-benzoyloxyethyl acrylate; methacrylic polymerizable monomers such as methyl methacrylate, ethyl methacrylate, n-propyl methacrylate, iso-propyl methacrylate, n-butyl methacrylate, iso-butyl methacrylate, tert-butyl methacrylate, n-amyl methacrylate, n-hexyl methacrylate, 2-ethylhexyl methacrylate, n-octyl methacrylate, n-nonyl methacrylate, diethyl phosphate ethyl methacrylate, and dibutyl phosphate ethyl methacrylate; methylene aliphatic monocarboxylic acid esters; vinyl esters such as vinyl acetate, vinyl propionate, vinyl butyrate, vinyl benzoate, and vinyl formate; vinyl ethers such as vinyl methyl ether, vinyl ethyl ether, and vinyl isobutyl ether; vinyl methyl ketone, vinyl hexyl ketone, and vinyl isopropyl ketone.

Next, the polymerizable monomer composition is put into an aqueous medium prepared in advance, and droplets composed of the polymerizable monomer composition are formed to the desired toner particle diameter by a stirrer or a disperser having a high shearing force. This step is called a granulation step. It is preferable that the aqueous medium in the granulation step include a dispersion stabilizer in order to control the particle diameter of the toner particles, sharpen the particle size distribution, and suppress the coalescence of the toner particles in the production process. The dispersion stabilizer is generally classified into polymers that develop a repulsive force due to steric hindrance and poorly water-soluble inorganic compound that stabilize the dispersion by an electrostatic repulsive force. Since the fine particles of the poorly water-soluble inorganic compound are dissolved by an acid or an alkali, the fine particles can be dissolved and easily removed by washing with an acid or an alkali after the polymerization, and thus are preferably used.

A poorly water-soluble inorganic compound including any one of magnesium, calcium, barium, zinc, aluminum, and phosphorus is preferably used as the dispersion stabilizer. More preferably, it is desired that any one of magnesium, calcium, aluminum and phosphorus be included. Specifically, the following can be mentioned.

Magnesium phosphate, tricalcium phosphate, aluminum phosphate, zinc phosphate, magnesium carbonate, calcium carbonate, magnesium hydroxide, calcium hydroxide, aluminum hydroxide, calcium metasilicate, calcium sulfate, barium sulfate, and hydroxyapatite.

Organic compounds such as polyvinyl alcohol, gelatin, methyl cellulose, methyl hydroxypropyl cellulose, ethyl cellulose, sodium salt of carboxymethyl cellulose, and starch may be used in combination with the dispersion stabilizer. It is preferable to use these dispersion stabilizers in an amount of at least 0.01 parts by mass and not more than 2.00 parts by mass with respect to 100 parts by mass of the polymerizable monomer.

Further, in order to make these dispersion stabilizers finer, a surfactant may be used in an amount of at least 0.001 parts by mass and not more than 0.1 parts by mass in combination with 100 parts by mass of the polymerizable monomer. Specifically, commercially available nonionic, anionic, and cationic surfactants can be used. For example, sodium dodecyl sulfate, sodium tetradecyl sulfate, sodium pentadecyl sulfate, sodium octyl sulfate, sodium oleate, sodium laurate, potassium stearate, and calcium oleate are preferably used.

After the granulation step or while performing the granulation step, the temperature is preferably set to at least 50° C. and not more than 90° C., and the polymerizable monomer contained in the polymerizable monomer composition is polymerized to obtain a toner particle dispersion liquid. This step is called a polymerization step. In the polymerization step, it is preferable to perform a stirring operation so that the temperature distribution in the container become uniform. Where a polymerization initiator is added, it can be carried out at any time and with the required time interval. Further, the temperature may be raised in the latter half of the polymerization reaction for the purpose of obtaining a desired molecular weight distribution, and further, in the latter half of the reaction or after the end of the reaction, the partially aqueous medium may be distilled off by a distillation operation in order to remove unreacted polymerizable monomers, by-products and the like from the system. The distillation operation can be performed under normal or reduced pressure.

An oil-soluble initiator is generally used as the polymerization initiator used in the suspension polymerization method. For example, the following can be mentioned.

Azo compounds such as 2,T-azobisisobutyronitrile, 2,T-azobis-2,4-dimethylvaleronitrile, 1,1'-azobis(cyclohexane-1-carbonitrile), and 2,2'-azobis-4-methoxy-2,4-dimethylvaleronitrile, and peroxide-based initiators such as acetylcyclohexylsulfonyl peroxide, diisopropyl peroxycarbonate, decanonyl peroxide, lauroyl peroxide, stearoyl peroxide, propionyl peroxide, acetyl peroxide, tert-butylperoxy-2-ethylhexanoate, benzoyl peroxide, tert-butyl peroxyisobutyrate, cyclohexanone peroxide, methyl ethyl ketone peroxide, dicumyl peroxide, tert-butyl hydroperoxide, di-tert-butyl peroxide, tert-butyl peroxypivalate, and cumene hydroperoxide.

The polymerization initiator may be used in combination with a water-soluble initiator as needed, and the following examples thereof may be mentioned.

Ammonium persulfate, potassium persulfate, 2,2'-azobis (N,N'-dimethylene-isobutyroamidine) hydrochloride, 2,2'-azobis (2-aminodinopropane) hydrochloride, azobis (isobutylamidine) hydrochloride, 2,2'-azobisisobutyronitrile sodium sulfonate, ferrous sulfate or hydrogen peroxide.

These polymerization initiators can be used alone or in combination of two or more, and in order to control the degree of polymerization of the polymerizable monomer, a chain transfer agent, a polymerization inhibitor, or the like can be further added and used. The toner of the present invention may include an organosilicon polymer and may have at least 1 and not more than 3 carbon atoms directly bonded to the silicon atoms of the organosilicon polymer. Further, the organosilicon polymer may have a partial structure represented by R—$SiO_{3/2}$. Here, R may be a hydrocarbon group having at least 1 and not more than 6 carbon atoms, or R may be a hydrocarbon group having at least 1 and not more than 3 carbon atoms.

The required amount of water-washing migration of inorganic silica is obtained by using a Henschel mixer (manufactured by Nippon Coke Industries Co., Ltd.) and changing the external addition amount, the rotation speed (peripheral speed) of the tip of the blade, and the rotation time (time) of the blade, which are the external addition conditions. Hereinbelow, Table 1 shows the external addition conditions of the toner a. The details of the peripheral speed and time, which are external conditions, are as described in Japanese Patent Application Publication No. 2016-38591. Further, 0.20 wt % of zinc stearate was externally added to the toner used in Example 1.

photosensitive member 1 in repeated image forming operations. In the contact charging method, the amount of discharge is smaller and the amount of discharge products generated is smaller than those in the corona charging method using a corona charging device. However, since there is a minute void between the photosensitive member 1 and the charging roller 2, even if the generated amount of discharge products is small, the discharge products are likely to adhere to the surface of the photosensitive member 1 under the effect of physical rubbing between the photosensitive member 1 and the charging roller 2. When the discharge products adhere to the surface of the photosensitive member 1, the coefficient of friction between the surface of the photosensitive member 1 and the cleaning blade 8 increases. As a result, the drive torque of the photosensitive member 1 becomes high and the load on the drive motor increases, the amount of electric power increases, or it becomes difficult to start the motor.

Therefore, in order to reduce the influence of the discharge products, in Example 1, the metal soap **45*c* is supplied to the surface of the photosensitive member 1, and the discharge products are prevented from adhering by forming a film of the metal soap 45*c* on the surface of the photosensitive member 1**.

7. Metal Soap Coating Operation

In Example 1, apart from the normal image forming operation, a metal soap supply operation (hereinafter, also referred to as a metal soap coating operation) in which the metal soap is supplied from the developing roller to the surface of the photosensitive member is executed. The timing for executing the metal soap coating operation is when the number of prints since the previous execution of the metal soap coating operation reaches a predetermined number, or when it is determined that the torque during driving is high, and the metal soap coating operation is executed during image non-forming operation in which an image forming operation is not performed. For example, the metal soap coating operation is executed during the rotation of the photosensitive member 1 before the image forming operation or during the rotation of the photosensitive member 1 after the image forming operation. Further, the metal soap coating operation may be executed at the timing designated by the user.

TABLE 1

| | Organosilicon particle | | | | | | | | Metal soap | |
|---|---|---|---|---|---|---|---|---|---|---|
| | First-stage external addition conditions | | | | Second-stage external addition conditions | | | | | External |
| | Amount of silica [wt %] | Device | Peripheral speed [m/s] | Time [sec] | Amount of silica [wt %] | Device | Peripheral speed [m/s] | Time [sec] | Type | addition amount [wt %] |
| Toner a | 0.8 | Surface improvement device | 40 | 300 | 0.8 | Surface improvement device | 40 | 60 | Zinc stearate | 0.2 |

6. Effect of Discharge Products on Photosensitive Member

Where discharging is performed at the charging roller 2 when executing an image forming operation by using the image forming apparatus 100, discharge products such as ozone and NOx may be generated and adhere to the surface of the photosensitive member 1. The discharge products are scraped off by the cleaning blade 8 or the like that abuts on the photosensitive member 1, but where the amount that adheres is larger than the amount scraped off, the discharge products are gradually accumulated on the surface of the Furthermore, it was decided to execute the metal soap coating operation in an operation mode selected from two types of operation modes, the first mode and the second mode, according to the usage status of the process cartridge 7.

The first mode is executed when the process cartridge 7 is in the initial usage state, that is, when the total number of prints is less than a threshold value. At the initial usage state of the process cartridge 7, the friction coefficient on the surface of the photosensitive member 1 is high, and it is desirable to promptly and actively supply the metal soap **45*c*** to the surface of the photosensitive member 1 to reduce the friction coefficient. Meanwhile, it is desirable not to supply the toner 10 because a blocking layer composed of an external additive is not sufficiently formed between the photosensitive member 1 and the cleaning blade 8 and the state is also assumed in which the cleaning performance is unstable.

Therefore, in the first mode, in order to supply the metal soap 45*c* actively and reduce the friction coefficient of the surface of the photosensitive member 1, the potential difference ΔVr (=Vdc - Vrs) of the supply roller 5 with respect to the developing roller 4 is set to a polarity opposite to that of the metal soap 45*c*. That is, the applied voltages of the supply roller 5 and the developing roller 4 are controlled so that the potential difference ΔVr that causes an electrostatic force in the direction from the supply roller 5 toward the developing roller 4 to act on the metal soap 45*c* is formed between the supply roller 5 and the developing roller 4. By making the polarity of AVr to be opposite to that in which the metal soap 45*c* is charged, the metal soap 45*c* can be moved to the developing roller 4 side, and the metal soap 45*c* can be prevented from moving to the supply roller 5 side, so that a large amount of metal soap 45*c* can be supplied on the surface of the photosensitive member 1.

In Example 1, Vdc=−300 V, Vrs=−100 V, and ΔVr=−200 V are set in the first mode. Since the metal soap 45*c* is positively charged, the metal soap 45*c* actively moves to the developing roller 4 side.

Further, by applying a charging voltage to control the photosensitive member 1 to have a dark potential Vd and making the developing voltage the same as during the image forming operation, so-called solid white printing is performed, and only the metal soap 45*c* is developed on the surface of the photosensitive member 1.

The second mode is executed when the process cartridge 7 is used in the middle stage or later, that is, when the total number of prints is equal to or more than the threshold value. In the middle usage stage of the process cartridge 7, a sufficient blocking layer is formed between the photosensitive member 1 and the cleaning blade 8, and it is desirable to periodically supply the toner 10 to maintain the blocking layer. Meanwhile, in order to suppress the phenomenon that the metal soap 45*c* is transferred to the charging roller 2 by the photosensitive member 1 and covers the surface of the charging roller 2 so that it is not properly charged (charging roller coverage), it is desirable to reduce the supply amount of the metal soap 45*c*.

Accordingly, in the second mode, the metal soap 45*c* is not actively supplied in order to prevent the charging roller from being covered, but the toner 10 which is the component of the blocking layer between the photosensitive member 1 and the cleaning blade 8 is supplied. For this purpose, the applied voltages of the supply roller 5 and the developing roller 4 are controlled so that the potential difference ΔVr that is formed between the supply roller 5 and the developing roller 4 and causes an electrostatic force in the direction from the supply roller 5 toward the developing roller 4 to act on the metal soap 45*c* becomes smaller than that in the first mode. In Example 1, the applied voltages of the supply roller 5 and the developing roller 4 are controlled so that the polarity of the potential difference ΔVr in the second mode becomes opposite to that in the first mode. In particular, the applied voltages of the supply roller 5 and the developing roller 4 are controlled so that the potential difference ΔVr becomes the same as that at the time of image formation. Specifically, the drive is started under the high voltage condition and drive condition at the time of image formation, the photosensitive member 1 is irradiated with a laser, and a constant amount of the toner 10 is supplied. In the second mode, the settings are as follows: Vdc=−300 V, Vrs=−350 V, and AVr=+50 V. Since the metal soap 45*c* is charged to a positive polarity, the metal soap 45*c* is attracted to the supply roller 5 side, and the movement of the metal soap 45*c* to the developing roller 4 side can be limited to the movement of the amount that has adhered to the toner 10. Therefore, the supply amount of the metal soap 45*c* can be reduced.

As described above, in Example 1, the control unit 202 executes the image forming operation of forming a toner image on the recording material S and a coating operation of coating the metal soap 45*c* on the surface of the photosensitive member 1. The control unit 202 performs the coating operation in the operation mode which is either the first mode in which a voltage is applied to the supply roller 5 and the developing roller 4 under conditions different from those at the time of executing the image forming operation or the second mode in which of the voltage is applied to the supply roller 5 and the developing roller 4 under the same conditions as those at the time of executing the image forming operation. In Example 1, an example is shown in which the application of voltage in the second mode is performed under the same conditions as at the time of image forming operation, but the control conditions in the second mode are not limited to this example. The amount of the metal soap 45*c* supplied from the developing roller 4 to the surface of the photosensitive member 1 in the second mode may be smaller than that in the first mode. For example, the potential difference ΔVr may have the same polarity that causes the electrostatic force in the direction from the supply roller 5 to the developing roller 4 to act on the metal soap 45*c* in both the first mode and the second mode, and the absolute value of the potential difference ΔVr may be made to be smaller in the second mode than in the first mode. Also in this case, since the supply amount of the metal soap 45*c* in the first mode is increased, the increase in torque of the photosensitive member 1 can be suppressed, and the supply amount of the metal soap 45*c* in the second mode is decreased, so that the effect of suppressing the charging roller coverage is obtained as well. Further, as a potential difference in the polarity that causes an electrostatic force in the direction from the supply roller 5 to the developing roller 4 to act on the metal soap 45*c*, the potential difference in the second mode may be smaller than the potential difference in the first mode. As a result, the supply amount of the metal soap 45*c* in the second mode becomes smaller than the supply amount of the metal soap 45*c* in the first mode. For example, where the potential difference ΔVr in the first mode is in the polarity that causes an electrostatic force in the direction from the supply roller 5 to the developing roller 4 to act on the metal soap 45*c*, and the potential difference ΔVr in the second mode is in the opposite polarity, the conditions may not be the same as at the time of image formation. In this case as well, it can be said that as a potential difference in the polarity that causes an electrostatic force in the direction from the supply roller 5 to the developing roller 4 to act on the metal soap 45*c*, the potential difference ΔVr in the second mode may be smaller than the potential difference ΔVr in the first mode.

Where the difference between the surface potential of the photosensitive member 1 charged by the charging roller 2 and the developing voltage applied to the developing roller 4 is taken as a back contrast, the control may be performed such that the back contrast at the time of coating operation becomes larger than the back contrast at the time of image forming operation. By controlling the applied voltages of the charging roller 2 and the developing roller 4 in this way, the metal soap 45*c* is efficiently transferred to the photosensitive member 1 at the time of coating operation. Further, the back contrast may be controlled so as to make the amount of the metal soap 45*c* supplied from the developing roller 4 to the surface of the photosensitive member 1 smaller in the second mode than in the first mode. Specifically, the applied voltages of the charging roller 2 and the developing roller 4 may be controlled so that the back contrast becomes smaller in the second mode than in the first mode. As a result, the torque increase of the photosensitive member 1 can be suppressed by efficiently supplying the metal soap 45*c* in the first mode, and the supply amount of the metal soap 45*c* in the second mode is reduced, so that the charging roller coverage can be suppressed.

Figure 6:
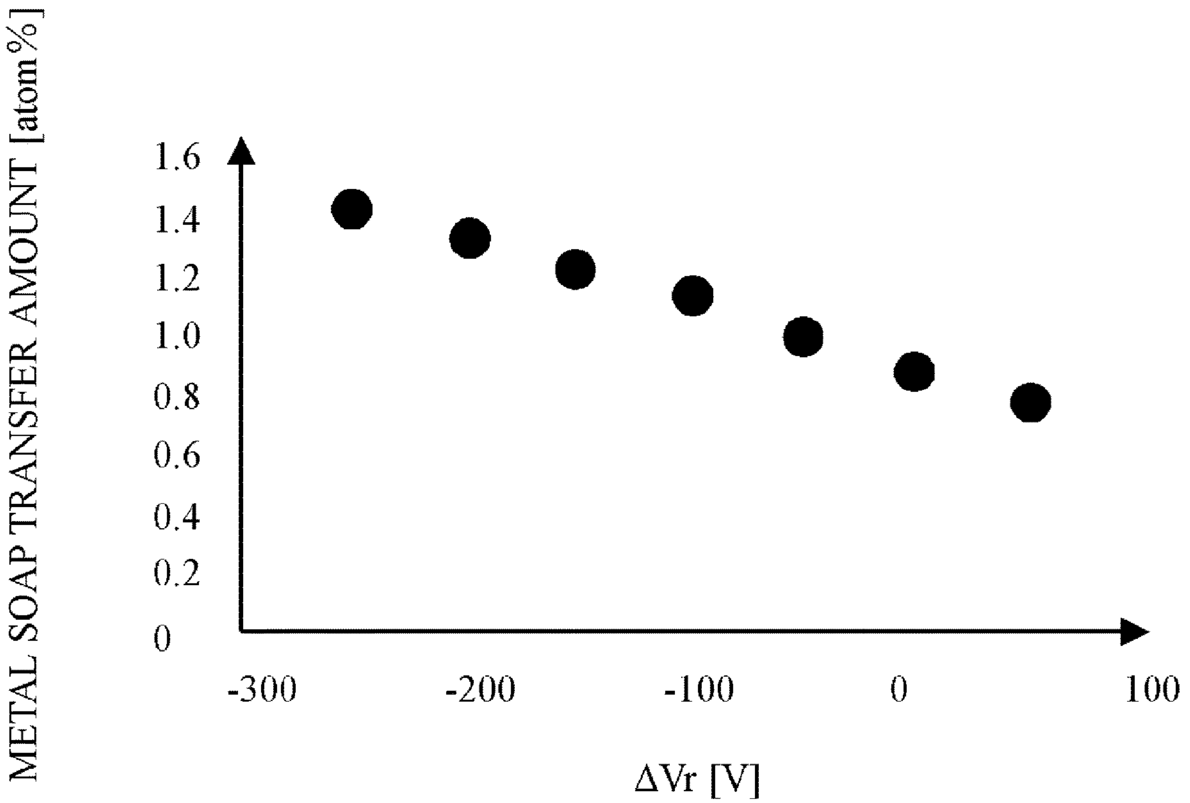
FIG. 6 illustrates ΔVr and the transfer amount of metal soap in Example 1.

FIG. 6 shows the results of measuring the amount of the metal soap 45*c* transferred to the surface of the photosensitive member 1 for various ΔVr by using a scanning X-ray photoelectron spectroscopy analyzer. Where Vrs is on the positive polarity side of Vdc (first mode), ΔVr is large on the negative polarity side (small as a value). At this time, it can be seen that the amount of the transferred metal soap 45*c* increases. A method for measuring the amount of the metal soap 45*c* transferred to the photosensitive member 1 will be described hereinbelow. Fragments of the photosensitive member 1 were cut out from the photosensitive member 1 subjected to the metal soap coating operation at various ΔVr. By measuring the surface of the fragments of the photosensitive member 1 with a scanning X-ray photoelectron spectroscopic analyzer, the element concentration value of zinc (Zn) was calculated, and the amount of the transferred metal soap 45*c* was calculated. The measurement conditions of the scanning X-ray photoelectron spectroscopy analyzer are as follows.

Analytical device: scanning type X-ray photoelectron spectroscopic analyzer (ESCA system ULVAC PHI 5700 (manufactured by ULVAC-PHI, Inc.))

Vacuum degree: not more than $3.99\times10^{-5}$ Pa

X-ray source: Mg radiation source

Scan: narrow scan

Measurement elements: Cls, Ols, Mg2*s*, Si2*p*, Zn2*p*3

X-ray incident angle: 45 degrees

Measurement method: measurement was performed at a random location of an electron beam or ultraviolet (wavelength of 125 nm to 260 nm) irradiation portion and an electron beam or ultraviolet non-irradiation portion.

Figure 5:
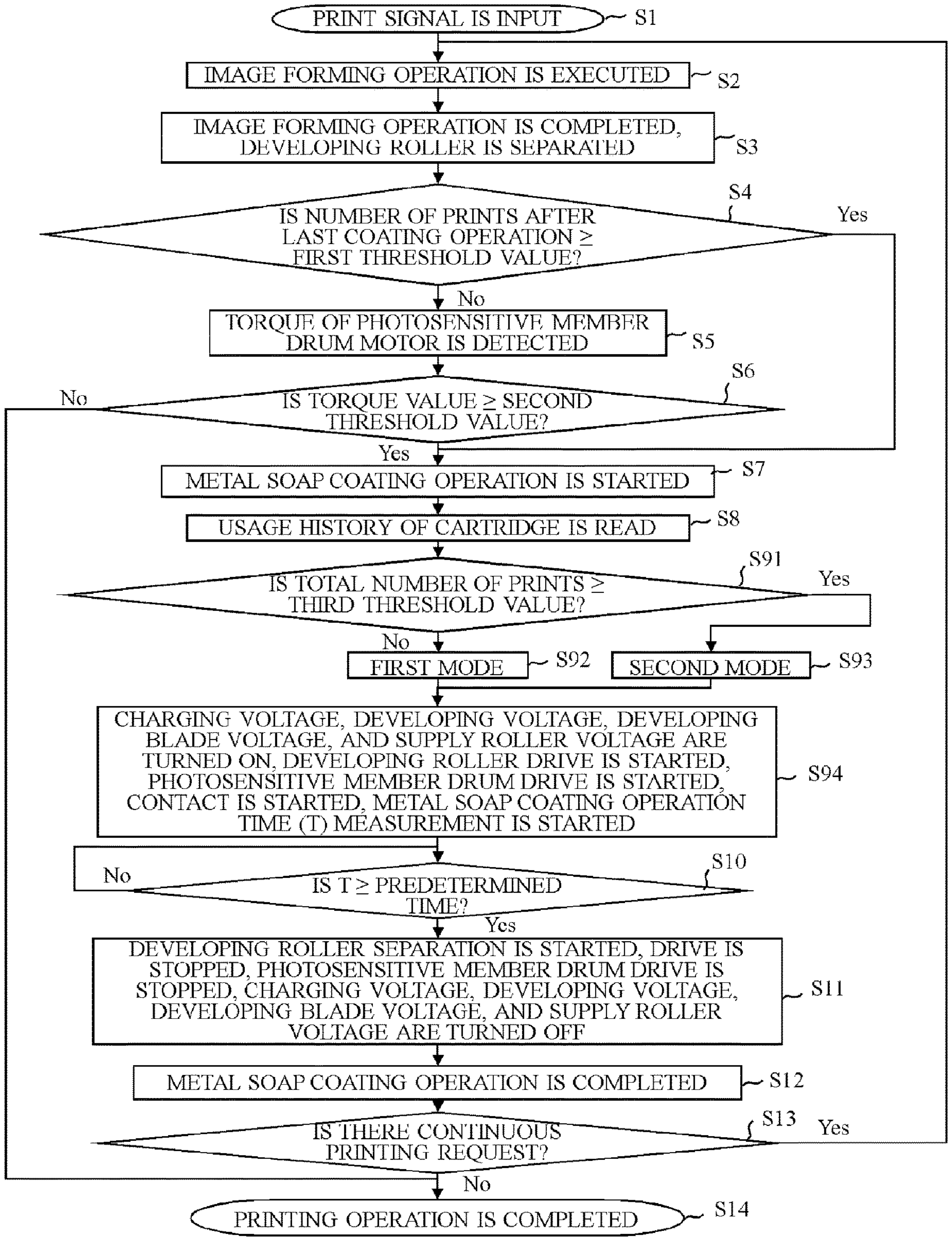
FIG. 5 is a flowchart in Example 1.

Analysis software: PHI MultiPak (trademark) (manufactured by ULVAC-PHI, Inc.) was used. The spectrum of each element was displayed with smoothing correction: Point9 and background correction: OFF SET, and the element concentration value (atom %) was calculated from the spectrum area obtained by drawing a baseline. 8. Control Procedure for Metal Soap Coating Operation Next, the control procedure of the metal soap coating operation will be described with reference to the flowchart of FIG. 5. In Example 1, the metal soap coating operation is executed by the control unit 202. A case of executing the metal soap coating operation after the image forming operation will be described as an example of timing for executing the metal soap coating operation.

When the image forming apparatus 100 is ready for image formation and a print signal is input by a user (S1), the image forming operation is executed (S2). Where the image forming operation is completed, the developing roller 4 is separated from the photosensitive member 1 to stop the drive, and various voltages are turned off (S3).

Next, it is determined whether the total number of prints since the last time the metal soap coating operation was executed is at least a predetermined number (S5). Where the total number of prints is at least the first threshold value, a transition is made to (S7). Where the total number of prints is less than the first threshold value, a transition is made to the torque detection operation of the drive motor of the photosensitive member 1 (S5). In Example 1, the predetermined number of prints was set to 500. The predetermined number of prints is exemplary and not limited to this value, and the predetermined number can be set, as appropriate, according to the device configuration, required accuracy, and the like. Further, a method for counting the total number of prints can be performed by recording a number of rotations of the photosensitive member 1. The recording of the number of rotations of the photosensitive member 1 is stored in a cartridge memory 300 as the first recording unit. The cartridge memory 300 is provided in the photosensitive member unit 13 of the process cartridge 7, and information is input/output via the cartridge memory communication mechanism 52.

It is determined whether the torque value of the drive motor of the photosensitive member 1 detected by the torque detection mechanism 51 as a torque detection unit is at least the second threshold value (S6). Where the torque value is at least the second threshold value, a transition is made to the metal soap coating operation (S7), and where the torque value is less than the second threshold value, the printing operation ends (S14). In Example 1, a predetermined torque threshold value was set to 2.0 kgf cm. The value of the torque threshold value is not limited to this exemplary value and can be set, as appropriate, according to the device configuration, required accuracy, and the like.

Where the metal soap coating operation is started (S7), the usage history is confirmed via the cartridge memory communication mechanism 52 (S8). The usage history of the process cartridge 7 is recorded in the cartridge memory 300, which is a non-volatile memory attached to the photosensitive member unit 13. As the usage history of the process cartridge 7, information such as the total number of prints of the process cartridge 7 is recorded in the cartridge memory 300 as the second recording unit. A method of counting the total number of prints of the cartridge 7 can be performed by recording the total number of rotations of the photosensitive member 1.

Next, it is determined whether the total number of prints of the process cartridge 7 is at least the third threshold value (S91). The third threshold value is a threshold value for determining whether the usage state of the process cartridge 7 is in the initial stage of use or in the middle of the service life, and can be set, as appropriate, according to the configuration of the process cartridge 7, required control accuracy, and the like. Where the total number of prints is less than the third threshold value, the first mode is selected (S92), and where the total number of prints is at least the third threshold value, the second mode is selected (S93). The charging voltage, developing voltage, developing blade voltage, and supply voltage are applied according to the selected operation mode, the drive of the developing roller 4 and the photosensitive member 1 is started, and the developing roller 4 is brought into contact with the photosensitive member 1 to start the measurement of the metal soap coating operation time (T) (S94).

The metal soap coating operation is continuously executed until the predetermined metal soap coating operation time T is reached (S10). Where the metal soap coating operation time T reaches the predetermined time, the developing roller 4 is separated from the photosensitive member 1, the drive of the developing roller 4 and the photosensitive member 1 is stopped, and the applied voltages are turned off (S11). The metal soap coating operation is thus completed (S12). In Example 1, the predetermined time was set to 5 sec. The predetermined time T is not limited to 5 seconds and can be set as appropriate.

Subsequently, it is determined whether there is a continuous printing request (S13). Where there is no continuous printing request, a transition is made to the printing completion operation (S14), and where there is a continuous printing request, the operations of S2 to S13 are repeated until the continuous printing request disappears.

The metal soap coating operation in S7 may be executed immediately after the image forming operation in S2 without separating the developing roller 4, stopping the drive, or turning OFF the voltages in S3.

Further, the metal soap coating operation in S7 may be executed during the initial operation confirmation control that is first executed when a new cartridge is mounted.

9. Verification of Effect of Example 1 (effect of setting the metal soap coating operation to two modes)

By using Example 1 and comparative examples, it was verified whether it is possible to suppress the increase in torque due to the adhesion of discharge products to the surface of the photosensitive member 1 and the generation of charging roller coverage in which the metal soap covers the charging roller 2 in Example 1 described above. For verification, a low printing intermittent durability test was performed on 50K sheets in an environment of low temperature and low humidity (temperature 15° C., humidity 10%) where charging roller coverage is likely to occur. In this low printing intermittent durability, horizontal lines having an image ratio of 1% were printed on the recorded image, and 400 g of toner was loaded.

In Example 1, the metal soap coating operation was executed in the first mode at the initial stage and in the second mode at and after the middle stage.

In Comparative Example 1, the metal soap coating operation was executed only in the first mode.

In Comparative Example 2, the metal soap coating operation was executed only in the second mode.

Verification Results 1

Table 2 shows the verification results.

TABLE 2

| Usage status of cartridge | Problem | Example 1 | Comparative Example 1 | Comparative Example 2 |
|---|---|---|---|---|
| Initial stage | Torque | ○ | ○ | Δ |
| | Coverage | ○ | ○ | X |
| Middle stage | Torque | ○ | ○ | ○ |
| | Coverage | ○ | X | ○ |

In Example 1, the torque did not increase during printing of 50K sheets and no image defects due to the charging roller coverage occurred. Meanwhile, in Comparative Example 1, although the initial torque did not increase and the charging roller coverage did not occur, a large amount of the metal soap 45*c* adhered to the charging roller 2 at 40K sheets in the middle stage, and a large number of streaks occurred due to poor charging caused by charging roller coverage.

Further, in Comparative Example 2, the torque slightly increased at the initial stage, a large amount of toner 10 that slipped through the cleaning blade 8 adhered to the charging roller 2, and a large number of streaks occurred due to poor charging caused by charging roller coverage. At the time of 10K sheets in the middle stage, the torque was stable and the progress of charging roller coverage stopped, but vertical streak images continued to appear up to 50K sheets due to the initial influence.

In this verification, by selecting the first mode in the initial stage and the second mode in the middle stage for the metal soap coating operation of Example 1 according to the usage status of the process cartridge 7, it was possible to suppress both the charging torque coverage and the torque increase due to the metal soap until the end of the service life.

Example 2

In Example 2, the selection of the optimum range of the difference in surface movement speed between the surface of the developing roller 4 and the surface of the photosensitive member 1 will be explained as one of the methods for coating the metal soap more effectively during the metal soap coating operation of Example 1.

1. Surface Movement Speed During Metal Soap Coating Operation

Where the developing roller 4 comes into contact with the photosensitive member 1, a developing nip is formed in the developing portion. As a result of providing a surface movement speed difference between the surface of the developing roller 4 and the surface of the photosensitive member 1, the toner 10 rotates in the developing nip portion, and the metal soap 45*c* is supplied to the photosensitive member 1. The ratio of the surface movement speed of the developing roller 4 to the surface movement speed of the photosensitive member 1 is referred to as a DD peripheral speed ratio. As the DD peripheral speed ratio is increased, the toner 10 rolls more, the chance of contact between the metal soap 45*c* and the photosensitive member 1 increases, and the transfer easily occurs. Therefore, a film of the metal soap 45*c* is likely to be formed on the surface of the photosensitive member 1. Accordingly, in order to efficiently coat the metal soap, it is desirable that the difference between the surface movement speed of the developing roller 4 and the surface movement speed of the photosensitive member 1 be large.

Figure 7:
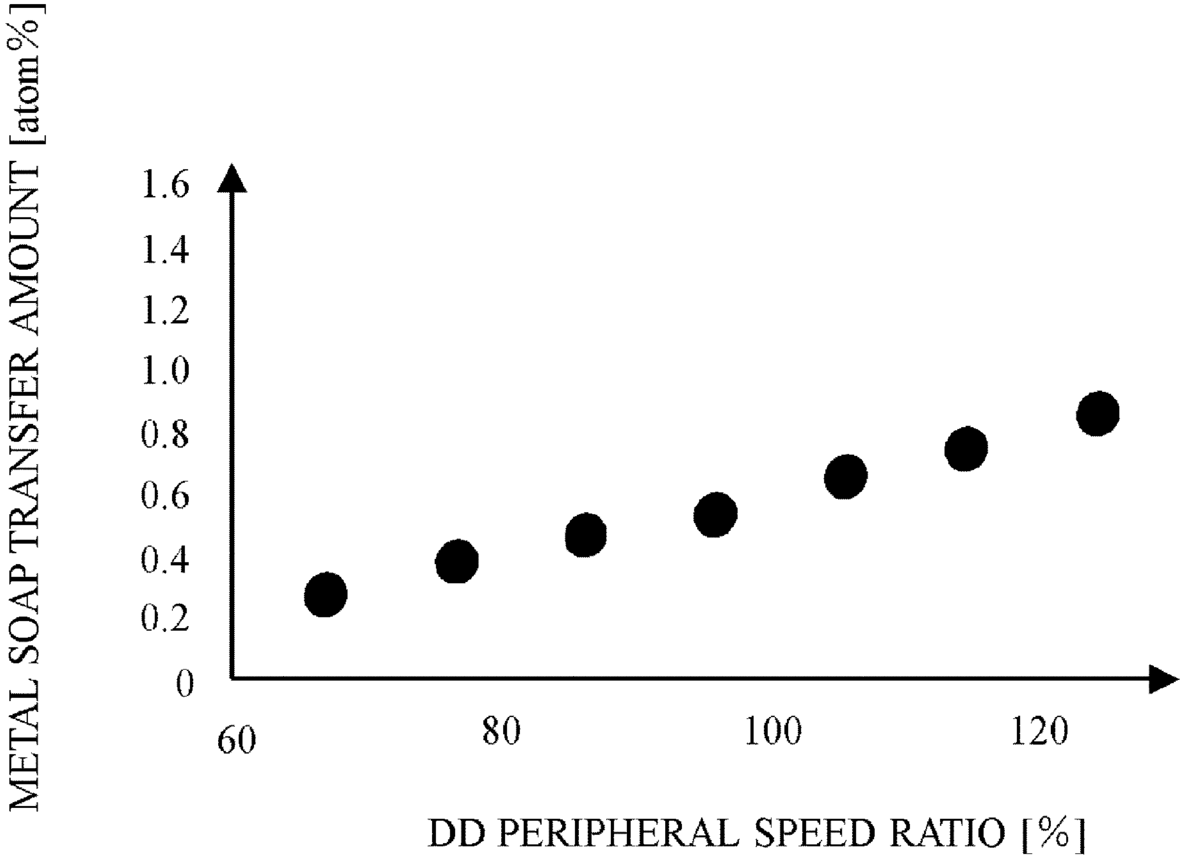
FIG. 7 illustrates the DD peripheral speed ratio and the transfer amount of metal soap in Example 2.

When the amount of the metal soap 45*c* transferred to the surface of the photosensitive member 1 was actually measured, as shown in FIG. 7, it was found that the transfer amount of the metal soap 45*c* increases as the DD peripheral speed ratio increases. The transfer amount of the metal soap 45*c* to the surface of the photosensitive member 1 was measured using a scanning X-ray photoelectron spectroscopy analyzer as in Example 1.

The index indicating the difference in surface movement speed between the surface of the photosensitive member 1 and the surface of the developing roller 4 is not limited to the DD peripheral speed ratio, and the surface movement speed difference (DD peripheral speed difference) may be used. As a method for changing the DD peripheral speed ratio and the DD peripheral speed difference, the rotation speed of the developing roller 4 may be changed, or the rotation speed of the photosensitive member 1 may be changed.

However, it is also known that where the image forming operation is always executed in a state where the DD peripheral speed ratio is large, the toner 10 is deteriorated and ground fogging, which is the adhesion of toner to a non-image portion of the photosensitive member 1 (the surface of the photosensitive member on which the dark potential Vd is formed), is likely to occur.

Regarding the deterioration of the toner 10, the metal soap 45*c* is excessively supplied at the initial stage, and the metal soap 45*c* is depleted from the developing chamber 3*a* and the toner accommodating portion 3*b*. Not only that, the number of times the toner 10 is rubbed increases, the toner 10 deteriorates, and the charging performance deteriorates.

Figure 8:
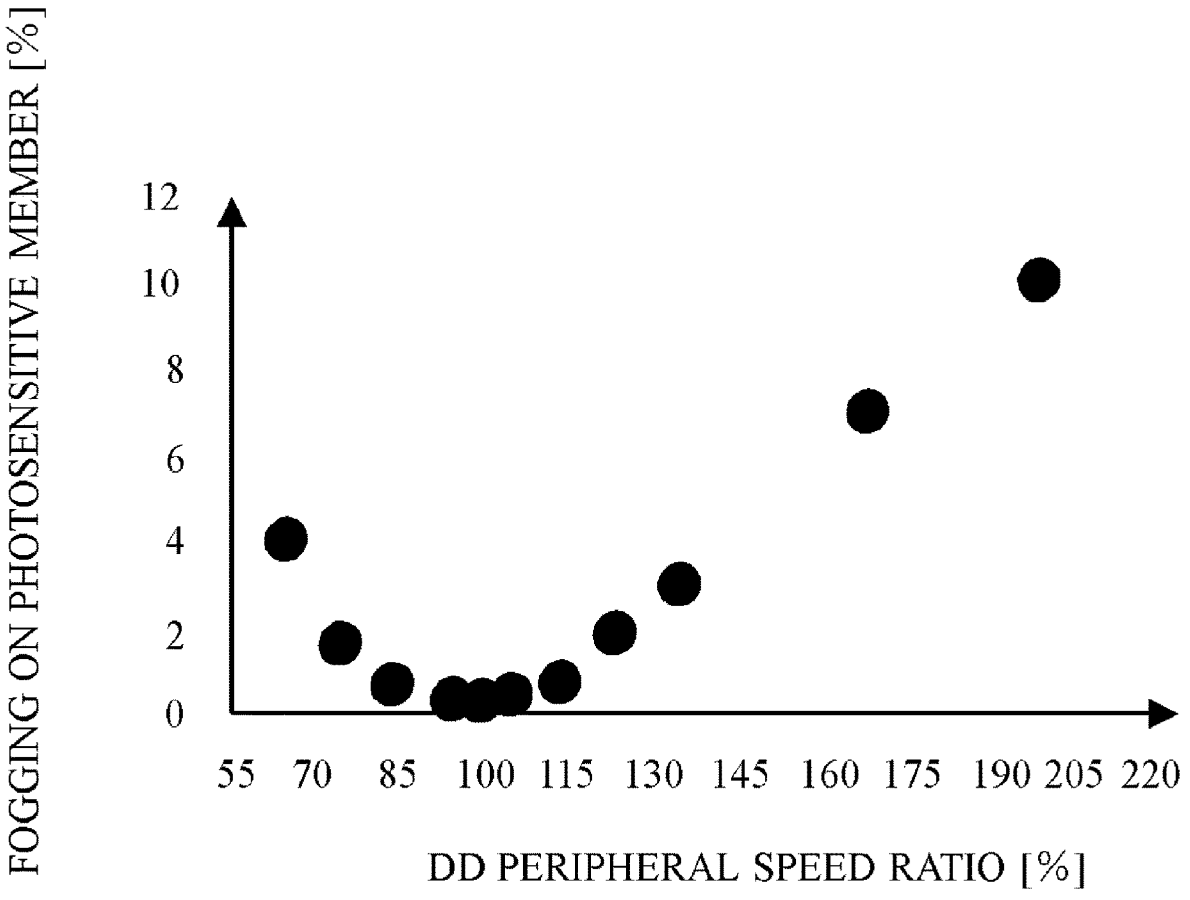
FIG. 8 illustrates the DD peripheral speed ratio and the amount of fogging on the photosensitive member in Example 2.

Regarding the ground fogging, where the toner 10 rolls too much, the charge of the toner 10 easily escapes, and the charging performance of the toner 10 decreases. As a result, the toner 10 is developed as fogging on the photosensitive member 1, and cleaning may not be performed properly in the initial state where the cleaning property is unstable. For this reason, in Example 2, as shown in FIG. 8, the rotation speeds of the photosensitive member 1 and the developing roller 4 are controlled so that the DD peripheral speed ratio at the time of coating operation is between 85% and 115% so that the fogging value on the photosensitive member 1 is not more than 0.5%. Further, apart from this Example 2, the DD peripheral speed ratio at the time of coating operation may be set between 70% and 180% so that the fogging value on the photosensitive member 1 is not more than 1.0%, but the DD peripheral speed ratio of 85% to 115%, as in Example 2, is particularly preferable.

Further, as in Example 1, a charging voltage is applied to control the photosensitive member 1 to a dark potential Vd, and the so-called solid white printing is performed by setting the same developing voltage as at the time of image forming operation.

2. Verification of Effect of Example 2 (effect of DD peripheral speed ratio of 85% to 115%)

By using Example 2 and comparative examples, it was verified whether it is possible to suppress the increase in torque due to the adhesion of discharge products to the surface of the photosensitive member 1 and the generation of charging roller coverage in which the metal soap covers the charging roller 2 in Example 2 described above. The verification was performed under the same conditions as in Example 1.

In Example 2, the DD peripheral speed ratio during the metal soap coating operation was set to 115%.

In Comparative Example 3, the DD peripheral speed ratio during the metal soap coating operation was set to 75%.

In Comparative Example 4, the DD peripheral speed ratio during the metal soap coating operation was set to 125%.

Verification Results 2

Table 3 shows the verification results.

TABLE 3

| Usage status of cartridge | Problem | Example 2 | Comparative Example 3 | Comparative Example 4 |
|---|---|---|---|---|
| Initial stage | Torque | ○ | ○ | ○ |
| | Image defects | ○ | X | X |
| Middle stage | Torque | ○ | ○ | ○ |
| | Image defects | ○ | ○ | ○ |

In Example 2, the torque did not increase during printing of 50K sheets and no image defects occurred due to the charging roller coverage. Meanwhile, in Comparative Examples 3 and 4, the toner 10 developed on the photosensitive member 1 as fogging slipped through the cleaning blade 8, a large amount of the toner 10 adhered to the charging roller 2, and a large number of vertical streaks occurred due to poor charging caused by the charging roller coverage. At the time of 10K sheets in the middle stage, the progress of charging roller coverage stopped, but vertical streak images continued to appear up to 50K sheets due to the initial influence.

As described above, it was shown that by setting the DD peripheral speed ratio during the metal soap coating operation within the range of 85% to 115% described in Example 2, it is possible to suppress both the increase in torque and the coverage of the charging roller due to the metal soap until the end of the service life. The DD peripheral speed ratio may be controlled so that the DD peripheral speed ratio becomes larger at the time of executing the metal soap coating operation than at the time of executing the image forming operation. For example, by setting the DD peripheral speed ratio at the time of executing the metal soap coating operation to 115% and the DD peripheral speed ratio at the time of executing the normal image forming operation to 90%, it is possible to achieve both the efficient coating of the metal soap in the metal soap coating operation and the suppression of fogging at the time of image formation. Further, the DD peripheral speed ratio may be controlled so that the amount of the metal soap 45*c* supplied from the developing roller 4 to the surface of the photosensitive member 1 is smaller in the second mode than in the first mode. Specifically, the rotation speeds of the photosensitive member 1 and the developing roller 4 may be controlled so that the ratio of the surface movement speed of the developing roller 4 to the surface movement speed of the photosensitive member 1 in the second mode is smaller than in the first mode. As a result, the torque increase of the photosensitive member 1 can be suppressed by efficiently supplying the metal soap 45*c* in the first mode, and the supply amount of the metal soap 45*c* in the second mode is reduced, so that the charging roller coverage can be suppressed.

Example 3

In Example 3, a method for controlling the pre-exposure unit 27 will be described as a method for coating the metal soap more effectively during the metal soap coating operation of Example 1. 1. Method for Controlling Pre-Exposure Unit During Metal Soap Coating Operation During the metal soap coating operation, it is preferable that the exposure amount of the pre-exposure unit 27 be smaller than that at the time of image forming operation. In particular, the exposure may be turned OFF (no exposure by the pre-exposure unit 27 is performed). As a result of reducing the pre-exposure amount, static electricity is not eliminated on the surface of the photosensitive member 1, and residual electricity due to the remaining electric charge remains. Therefore, the electrical adhesion of the metal soap 45*c* having positive polarity, which is opposite to the normal polarity of the toner 10, to the photosensitive member 1 becomes stronger, so that the metal soap is unlikely to be peeled off from the surface of the photosensitive member 1. Where the metal soap 45*c* on the photosensitive member 1 passes through the cleaning blade 8 and the developing roller 4 in this state, the metal soap 45*c* is physically pushed into the photosensitive member 1 and firmly adheres to the photosensitive member 1. That is, by making the pre-exposure amount smaller than that at the time of image forming operation, it is possible to increase the holding ability of the metal soap 45*c* on the photosensitive member 1 resulting from the metal soap coating operation and to firmly adhere the metal soap 45*c* to the photosensitive member 1. Meanwhile, where the exposure amount by which the surface of the photosensitive member 1 is exposed is increased, the electrical adhesion of the electrode metal soap 45*c* having positive polarity to the photosensitive member 1 is weakened, and the metal soap may be easily peeled off from the surface of the photosensitive member 1.

Figure 9:
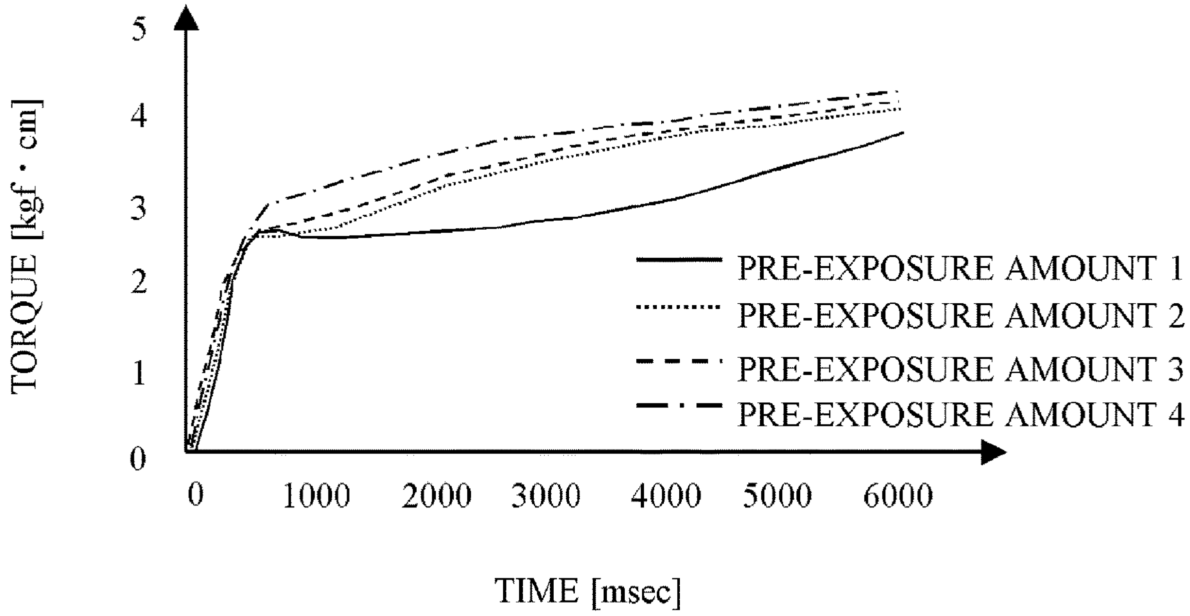
FIG. 9 illustrates the pre-exposure amount and the influence on the torque of the photosensitive member in Example 3.

When the torque of the photosensitive member 1 was actually measured under a plurality of conditions in which the pre-exposure amount was different, it was confirmed that the torque was reduced by reducing the pre-exposure amount as shown in FIG. 9.

Conditions for Pre-Exposure Amount

TABLE 4

| | Conditions | | | |
|---|---|---|---|---|
| | 1 | 2 | 3 | 4 |
| Pre-exposure amount [$\mu J/cm^2$] | 0 | 0.5 | 1.0 | 1.5 |

2. Verification of Effect of Example 3 (effect of reducing pre-exposure amount)

Durability was performed under the same conditions as in Example 1, and it was confirmed that there were no other harmful effects. In Example 3, the pre-exposure amount during the metal soap coating operation was set to OFF (=0 $\mu J/cm^2$).

Verification Results 3

Table 5 shows the verification results.

TABLE 5

| Usage status of cartridge | Problem | Example 1 | Example 3 |
|---|---|---|---|
| Initial stage | Torque | ○ | ◎ |
| | Image defects | ○ | ○ |
| Middle stage | Torque | ○ | ○ |
| | Image defects | ○ | ○ |

In Example 3, the initial torque reduction was achieved as compared with Example 1, and no image defects occurred until the end of the service life.

As described above, it was shown that the torque is reduced, especially in the initial state, by adding the control for reducing the exposure amount of the pre-exposure unit 27 during the metal soap coating operation. The pre-exposure unit 27 may be controlled so that the amount of the metal soap 45*c* supplied from the developing roller 4 to the surface of the photosensitive member 1 is smaller in the second mode than in the first mode. Specifically, the pre-exposure unit 27 may be controlled so that the exposure amount of the pre-exposure unit 27 is larger in the second mode than in the first mode. Further, in the first mode, the exposure by the pre-exposure unit 27 may not be performed, and in the second mode, the exposure by the pre-exposure unit 27 may be performed. As a result, the torque increase of the photosensitive member 1 can be suppressed by efficiently supplying the metal soap 45*c* in the first mode, and the supply amount of the metal soap 45*c* in the second mode is reduced, so that the charging roller coverage can be suppressed.

Example 4

In Example 4, a method for controlling the intermediate transfer belt 31 will be described as a method for coating the metal soap more effectively during the metal soap coating operation of Example 1. 1. Method for Controlling Intermediate Transfer Belt During Metal Soap Coating Operation Where the intermediate transfer belt 31 can be separated during the metal soap coating operation, by separating the intermediate transfer belt 31, it is possible to prevent the metal soap 45*c* from being collected by physical adhesion on the intermediate transfer belt 31. Further, by setting the primary transfer high voltage 73 to 0 V, it is possible to reduce the amount of the metal soap 45*c* collected by electrostatic adhesion on the intermediate transfer belt 31.

2. Verification of Effect of Example 4 (effect of intermediate transfer belt separation)

Durability was performed under the same conditions as in Example 1, and the effect on torque reduction was confirmed. In Example 4, the intermediate transfer belt 31 was separated during the metal soap coating operation.

Verification Results 4

Table 6 shows the verification results.

TABLE 6

| Usage status of cartridge | Problem | Example 1 | Example 4 |
|---|---|---|---|
| Initial stage | Torque | ○ | ◎ |
| | Image defects | ○ | ○ |
| Middle stage | Torque | ○ | ◎ |
| | Image defects | ○ | ○ |

In Example 4, the torque could be consistently reduced from the initial stage to the end of the service life as compared with Example 1, and no other image defects occurred.

As described above, the torque could be reduced by adding the control for separating the intermediate transfer belt 31 during the metal soap coating operation or setting the primary transfer high voltage 73 to 0 V. In Example 4, an example was shown in which the primary transfer high voltage 73 was set to 0 V at the time of executing the coating operation, but this example is not limiting. The primary transfer high voltage 73 may be controlled so that the potential difference that is formed between the photosensitive member 1 and the intermediate transfer belt 31 and that causes an electrostatic force in the direction from the photosensitive member 1 toward the intermediate transfer belt 31 to act on the metal soap 45*c* is smaller at the time of coating operation than at the time of image formation. As a result, the amount of the metal soap 45*c* collected on the intermediate transfer belt 31 at the time of executing the coating operation can be reduced. Further, the contact/separation of the intermediate transfer belt 31 may be controlled so that the amount of the metal soap 45*c* supplied from the developing roller 4 to the surface of the photosensitive member 1 is smaller in the second mode than in the first mode. Specifically, the intermediate transfer belt 31 may be controlled so that the intermediate transfer belt 31 is brought into contact with the photosensitive member 1 in the first mode and so that the intermediate transfer belt 31 is separated from the photosensitive member 1 in the second mode. As a result, the torque increase of the photosensitive member 1 can be suppressed by efficiently supplying the metal soap 45*c* in the first mode, and the supply amount of the metal soap 45*c* in the second mode is reduced, so that the charging roller coverage can be suppressed. Further, the primary transfer high voltage 73 may be controlled so that the amount of the metal soap 45*c* supplied from the developing roller 4 to the surface of the photosensitive member 1 is smaller in the second mode than in the first mode. Specifically, the primary transfer high voltage 73 may be controlled so that the potential difference that is formed between the photosensitive member 1 and the intermediate transfer belt 31 and causes an electrostatic force in the direction from the photosensitive member 1 toward the intermediate transfer belt 31 to act on the metal soap 45*c* to be larger in the second mode than in the first mode. As a result, the torque increase of the photosensitive member 1 can be suppressed by efficiently supplying the metal soap 45*c* in the first mode, and the supply amount of the metal soap 45*c* in the second mode is reduced, so that the charging roller coverage can be suppressed.

Example 5

In Example 5, the metal soap coating operation (initial supply operation) at the time of executing the initial operation of mounting the process cartridge 7 including the photosensitive member 1 in a new state on the image forming apparatus 100 and making a transition to a print-ready state and the control of the DD peripheral speed ratio will be described.

1. Metal Soap Coating Operation During Initial Operation and Control Method of DD Peripheral Speed Ratio During the initial operation, the same voltage application as in the first mode described in Example 1 is performed to execute the metal soap coating operation. At the time of executing the metal soap coating operation, the DD peripheral speed ratio is made larger than that at the time of executing the normal image forming operation. That is, assuming that the DD peripheral speed ratio at the time of executing the metal soap coating operation is the first peripheral speed ratio and the DD peripheral speed ratio at the time of executing the image forming operation is the second peripheral speed ratio, the first peripheral speed ratio is made larger than the second peripheral speed ratio. As a result, the metal soap can be transferred to the photosensitive member 1 more effectively, the amount of the metal soap coated from the developing roller 4 on the photosensitive member 1 can be increased, and the torque of the photosensitive member 1 can be reduced more quickly. Since the other features of Example 5 are the same as those of Example 1, the description thereof will be omitted.

2. Verification of Effects of Example 5

In Example 5, voltage application of the first mode was performed during the initial operation, and the metal soap coating operation was executed with Vdc=−300 V, Vrs=−100 V, and ΔVr=−200 V. The DD peripheral speed ratio at the time of the metal soap coating operation (first peripheral speed ratio) during the initial operation was set to 115% in Example 5 and 90% in Comparative Example 5, and the torque reduction effect and the presence/absence of image defect immediately after the initial operation was completed were confirmed. Here, the image defect is a vertical streak image caused by the charging roller coverage in which the metal soap covers the charging roller 2. The DD peripheral speed ratio at the time of executing the image forming operation (second peripheral speed ratio) after the completion of the initial operation was set to 90%.

Verification Results 5

Table 7 shows the verification results.

TABLE 7

| State of image forming apparatus | Problem | Comparative Example 5 | Example 5 |
|---|---|---|---|
| Immediately after initial operation at the time of new cartridge installation | Torque | ○ | ◎ |
| | Image defects | ○ | ○ |

In Example 5, the torque of the photosensitive member 1 immediately after the initial operation could be further reduced as compared with Comparative Example 5, and no image defects occurred.

Table 8 shows changes in the torque value of the photosensitive member 1 before and after the initial operation.

TABLE 8

| | Torque value [kgf · cm] | | |
|---|---|---|---|
| | Before initial operation | After initial operation | Torque reduction amount |
| Comparative example 5 | 2.8 | 2.2 | 0.6 |
| Example 5 | 2.8 | 1.9 | 0.9 |

In Example 5, the torque of the photosensitive member 1 could be further reduced as compared with Comparative Example 5.

The larger the DD peripheral speed ratio during the initial operation, the larger the metal soap coating amount and the torque can be reduced more quickly, but it is desirable that the upper limit of the DD peripheral speed ratio be 180%. This is because where the DD peripheral speed ratio is increased too much, the charging performance of the toner 10 decreases and the amount of the toner 10 developed as fogging on the photosensitive member 1 increases, as described in the Example 2. In particular, in a new process cartridge 7 having an unstable cleaning property, where the amount of fogging toner supplied to the photosensitive member 1 increases, the fogging toner cannot be sufficiently removed by cleaning, and poor charging occurs due to poor cleaning thereby causing image defects. In Example 5, by setting the DD peripheral speed ratio to 115% at the time of metal soap coating operation during the initial operation, it is possible to achieve both the torque reduction by coating the metal soap on the photosensitive member 1 and the suppression of the fogging toner. The DD peripheral speed ratio at the time of executing the image forming operation after the completion of the initial operation was set to 90%.

As described above, by increasing the DD peripheral speed ratio in the metal soap coating operation during the initial operation executed when the new process cartridge 7 is mounted on the image forming apparatus 100 with respect to that at the time of image forming operation, the torque of the photosensitive member 1 can be reduced more quickly. In addition, it is possible to make a quicker transition from a new product state in which the cleaning property is unstable to a state in which the cleaning property is stable. Further, with the control of Example 5, the torque of the photosensitive member 1 can be lowered more quickly while suppressing the increase of the load applied to the motor that drives the photosensitive member 1, without increasing the peripheral speed of the photosensitive member 1. Furthermore, since the time required for the initial operation can be shortened, the waiting time from mounting the new process cartridge 7 on the image forming apparatus 100 until printing becomes possible can be shortened, and the convenience for the user is also improved.

In Example 5, the DD peripheral speed ratio may be increased over the entire period of the initial operation, or the DD peripheral speed ratio may be increased during at least a part of the initial operation. In any case, there is an effect of lowering the torque of the photosensitive member 1 more quickly.

Further, in Example 5, the control for increasing the DD peripheral speed ratio in the period in which the metal soap coating operation is executed during the initial operation has been described. However, the DD peripheral speed ratio may be increased not only when the metal soap coating operation is executed but also when the initial operation is executed (a period other than the period during which the metal soap coating operation is executed).

For example, the DD peripheral speed ratio during the initial operation may be set to a value larger than 100% (for example, 115%). When the process cartridge 7 is new, the torque of the photosensitive member 1 is particularly high because the amount of toner that is interposed between the photosensitive member 1 and the cleaning blade 8 and serves as a lubricant is small. By bringing the developing roller 4 into contact with the photosensitive member 1 with the DD peripheral speed ratio during the initial operation (first peripheral speed ratio) set to a value larger than 100%, the rotation of the photosensitive member 1 can be assisted by the developing roller 4 that rotates more quickly than the photosensitive member 1. As a result, the torque of the photosensitive member 1 is reduced, and the load on the drive motor of the photosensitive member 1 can be reduced, so that the initial operation can be prevented from stopping due to a temporary excessive load on the motor. The DD peripheral speed ratio at the time of executing the image forming operation (second peripheral speed ratio) may be set to a value of not more than 100% (for example, 90%). This makes it possible to suppress fogging at the time of image formation. The control to increase the first peripheral speed ratio at the time of executing the initial operation, the control to make the first peripheral speed ratio at the time of executing the initial operation larger than the second peripheral speed ratio at the time of executing the image forming operation, the control to make the first peripheral speed ratio larger than 100%, and the control to make the second peripheral speed ratio not more than 100% are exemplified hereinabove. The torque reducing effect and the fogging suppressing effect by these types of control are obtained independently of the presence/absence of the metal soap contained in the toner.

It is also conceivable, for example, to perform voltage application at the time of image formation instead of voltage application in the first mode of the metal soap coating operation during the initial operation. The applied voltages in the first mode are, for example, Vdc=−300 V, Vrs=−100 V, and ΔVr=−200 V. The applied voltages at the time of image formation are, for example, Vdc=−300 V, Vrs=−350 V, and ΔVr=+50 V. At this time, by increasing the DD peripheral speed ratio (first peripheral speed ratio), as described in Example 2, the amount of toner developed as fogging on the photosensitive member 1 is slightly increased, and the fogging toner amount reaching the cleaning blade 8 also increases. Since the inorganic silicon 45*b* is externally added to the toner 10, the amount of the inorganic silicon 45*b* adhering to the photosensitive member 1 also increases slightly as the fogging toner amount adhering to the photosensitive member 1 increases. By appropriately passing the inorganic silicon 45*b* through the cleaning blade 8, the frictional resistance between the photosensitive member 1 and the cleaning blade 8 can be appropriately reduced. Therefore, by increasing the DD peripheral speed ratio during the initial operation (first peripheral speed ratio), the torque of the photosensitive member 1 can be reduced more quickly. The torque reduction effect of the photosensitive member 1 exerted by the control increasing the DD peripheral speed ratio (first peripheral speed ratio) by applying the same voltage at the time of executing the initial operation as at the time of executing the image forming operation is obtained independently of the presence or absence of the metal soap contained in the toner.

It is also conceivable to include a fluorine-containing low-friction substance such as Teflon in the contact member provided to be in contact with the developing roller 4. In the image forming apparatus having such a configuration, by increasing the DD peripheral speed ratio during the initial operation (first peripheral speed ratio), the low-friction substance can be more quickly transferred from the contact member to the developing roller 4, and then the low-friction substance can be even more quickly transferred to the photosensitive member 1. Therefore, the torque of the photosensitive member 1 can be reduced more quickly. Such a contact member can be exemplified by a sealing member that is in contact with the developing roller 4 at the longitudinal end of the developing roller 4 in order to prevent the toner inside the developing chamber 3*a* from leaking to the outside from the end of the developing roller 4. Another example is a sealing member that has a sheet-shaped member provided to be in contact with the entire area on the developing roller 4 in the longitudinal direction along the longitudinal direction and prevents the toner inside the developing chamber 3*a* from leaking to the outside. The torque reduction effect of the photosensitive member 1 exerted by the control increasing the DD peripheral speed ratio at the time of executing the initial operation (first peripheral speed ratio) in the configuration having the sealing member or sheet member in contact with the developing roller 4 is obtained independently of the presence or absence of the metal soap contained in the toner.

It is also possible to detect the torque of the photosensitive member 1 during the initial operation and increase the DD peripheral speed ratio when the torque is higher than a certain threshold value. For example, where the detected torque value is at least a fourth threshold value, the DD peripheral speed ratio at the time of executing the initial operation (first peripheral speed ratio) may be set larger than the DD peripheral speed ratio at the time of executing the image forming operation (second peripheral speed ratio). By appropriately controlling the torque according to the situation in this way, the motor load of the developing roller 4 can be suppressed.

Further, during the initial operation, the exposure amount of the pre-exposure unit 27 may be made smaller than that during the image forming operation, or the pre-exposure may be turned OFF (no exposure by the pre-exposure unit 27) as in Example 3. By reducing the pre-exposure amount, static electricity is not eliminated on the surface of the photosensitive member 1, and residual electricity due to the remaining electric charge remains. Therefore, the electrical adhesion of the metal soap 45*c* having positive polarity, which is opposite to the normal polarity of the toner 10, to the photosensitive member 1 becomes stronger, so that the metal soap is unlikely to be peeled off from the surface of the photosensitive member 1. As a result, the metal soap 45*c* is easily held by the photosensitive member 1, and the torque of the photosensitive member 1 can be reduced more quickly.

Further, during the initial operation, where the photosensitive member 1 and the intermediate transfer belt 31 can be brought into contact with each other as in Example 4, the transfer of the metal soap 45*c* to the intermediate transfer belt 31 by physical adhesion can be suppressed by separating the intermediate transfer belt 31. Therefore, the torque of the photosensitive member 1 can be reduced more quickly.

Further, even where the photosensitive member 1 and the intermediate transfer belt 31 are in contact with each other during the initial operation, the amount of the metal soap 45*c* transferred to the intermediate transfer belt 31 can be reduced by setting the primary transfer high voltage 73 to 0 V. Therefore, the torque of the photosensitive member 1 can be reduced more quickly.

Further, in Example 5, the configuration of the process cartridge 7 in which the developing unit 3 and the photosensitive member unit 13 are integrated has been described, but this configuration is not limiting. For example, in the case of a configuration in which only the photosensitive member unit 13 is made into a cartridge, the torque of the photosensitive member 1 can be reduced more quickly by adopting Example 5 in the initial operation performed when the photosensitive member unit 13 is a new product.

In Examples 1 to 5, reverse development was used, but such development is not limiting, and regular development may also be used. In Examples 1 to 5, the negatively charged photosensitive member 1 was used, but the present invention is not limited to this, and a positively charged photosensitive member may be used. Further, although a color laser printer was used as the image forming apparatus 100 in Examples 1 to 5, an image forming apparatus 100 having a single cartridge configuration such as a monochrome laser printer may also be used. Further, instead of the intermediate transfer method using the intermediate transfer belt 31, a method of directly transferring the toner image formed on the surface of the photosensitive member 1 to the recording material S may be used. In addition, the setting conditions used as explanations in Examples 1 to 5 are exemplary rather than limiting.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:

a rotatable image bearing member;

a developing member that supplies a toner to a surface of the image bearing member to form a toner image at a developing portion facing the image bearing member;

a supply member that supplies the toner to the developing member at a supplying portion in contact with the developing member; and a control unit that executes an image forming operation of forming the toner image on a recording material and a metal soap supply operation of supplying a metal soap that is included in the toner and has a polarity opposite to that of the toner to the surface of the image bearing member when an operation other than the image forming operation is executed, wherein an operation mode of the metal soap supply operation includes a first mode and a second mode, and wherein a potential difference that is formed between the supply member and the developing member and causes an electrostatic force in a direction from the supply member to the developing member to act on the metal soap is smaller at the time of executing the metal soap supply operation in the second mode than at the time of executing the metal soap supply operation in the first mode.

2. The image forming apparatus according to claim 1, wherein the polarities of the potential difference formed between the supply member and the developing member at the time of executing the metal soap supply operation in the first mode and at the time of executing the metal soap supply operation in the second mode are opposite to each other.

3. The image forming apparatus according to claim 1, wherein the polarities of the potential difference formed between the supply member and the developing member at the time of executing the metal soap supply operation in the second mode and at the time of executing the image forming operation are the same.

4. The image forming apparatus according to claim 1, wherein a ratio of a surface movement speed of the developing member to a surface movement speed of the image bearing member is larger at the time of executing the metal soap supply operation than at the time of executing the image forming operation.

5. The image forming apparatus according to claim 1, wherein a back contrast, which is a difference between a surface potential of the image bearing member in the developing portion and a developing voltage applied to the developing member, is larger at the time of executing the metal soap supply operation than at the time of executing the image forming operation.

6. The image forming apparatus according to claim 1, further comprising a transfer member facing the image bearing member with an intermediate transfer member, which is capable of contacting with and separating from the image bearing member, interposed therebetween, wherein at the time of executing the metal soap supply operation, the intermediate transfer member is separated from the image bearing member.

7. The image forming apparatus according to claim 1, further comprising a transfer member facing the image bearing member with an intermediate transfer member, which is capable of contacting with and separating from the image bearing member, interposed therebetween, wherein a potential difference that is formed between the image bearing member and the transfer member and causes an electrostatic force in a direction from the image bearing member to the transfer member to act on the metal soap is smaller at the time of executing the metal soap supply operation than at the time of executing the image forming operation.

8. The image forming apparatus according to claim 7, wherein a voltage applied to the transfer member is 0 V at the time of executing the metal soap supply operation.

9. The image forming apparatus according to claim 1, further comprising:

a charging member that charges the surface of the image bearing member, and an exposure unit that exposes the surface of the image bearing member on an upstream side of a charged portion formed by the charging member, wherein an exposure amount of the exposure unit is smaller at the time of executing the metal soap supply operation than at the time of executing the image forming operation.

10. The image forming apparatus according to claim 9, wherein the exposure is not performed by the exposure unit at the time of executing the metal soap supply operation.

11. The image forming apparatus according to claim 1, further comprising a torque detection unit that detects a drive torque of the image bearing member, wherein the control unit executes the metal soap supply operation in a case where the number of rotations of the image bearing member after the last execution of the metal soap supply operation is at least a first threshold value, or in a case where a torque value detected by the torque detection unit is at least a second threshold value.

12. The image forming apparatus according to claim 1, wherein the control unit executes the metal soap supply operation in the first mode in a case where a total number of rotations of the image bearing member is smaller than a third threshold value, and wherein the control unit executes the metal soap supply operation in the second mode in a case where the total number of rotations of the image bearing member is at least the third threshold value.

13. The image forming apparatus according to claim 1, wherein a ratio of a surface movement speed of the developing member to a surface movement speed of the image bearing member is a value between 85% and 115% at the time of executing the metal soap supply operation.

14. The image forming apparatus according to claim 1, wherein at the time of executing the metal soap supply operation, the developing unit comes into contact with the image bearing member at the developing portion.

15. The image forming apparatus according to claim 1, wherein a metal type of the metal soap is at least one of zinc, calcium, and magnesium.

16. The image forming apparatus according to claim 1, wherein the metal soap is at least one of zinc stearate, calcium stearate, and magnesium stearate.

17. The image forming apparatus according to claim 1, wherein the metal soap has a particle diameter of at least 0.15 μm and not more than 2.0 μm.

18. The image forming apparatus according to claim 1, wherein the image bearing member has a protective layer configured of an acrylic resin on an outermost surface layer.

19. An image forming apparatus comprising:

a rotatable image bearing member;

a developing member that supplies a toner to a surface of the image bearing member to form a toner image at a developing portion facing the image bearing member;

a supply member that supplies the toner to the developing member; and a control unit that executes an image forming operation of forming the toner image on a recording material and a metal soap supply operation of coating a metal soap that is included in the toner and has a polarity opposite to that of the toner on the surface of the image bearing member by supplying the toner from the developing member to the surface of the image bearing member when an operation other than the image forming operation is executed, wherein the operation mode of the metal soap supply operation includes a first mode and a second mode, wherein an amount of the metal soap supplied from the developing member to the surface of the image bearing member is smaller at the time of executing the metal soap supply operation in the second mode than at the time of executing the metal soap supply operation in the first mode, and wherein the polarities of the potential difference formed between the supply member and the developing member at the time of executing the metal soap supply operation in the first mode and at the time of executing the metal soap supply operation in the second mode are opposite to each other.

20. The image forming apparatus according to claim 19, wherein a potential difference that is formed between the supply member and the developing member and causes an electrostatic force in a direction from the supply member to the developing member to act on the metal soap is smaller at the time of executing the metal soap supply operation in the second mode than at the time of executing the metal soap supply operation in the first mode.

21. The image forming apparatus according to claim 19, wherein a ratio of a surface movement speed of the developing member to a surface movement speed of the image bearing member is smaller at the time of executing the metal soap supply operation in the second mode than at the time of executing the metal soap supply operation in the first mode.

22. The image forming apparatus according to claim 19, wherein a back contrast, which is a difference between a surface potential of the image bearing member in the developing portion and a developing voltage applied to the developing member, is smaller at the time of executing the metal soap supply operation in the second mode than at the time of executing the metal soap supply operation in the first mode.

23. The image forming apparatus according to claim 19, further comprising a transfer member facing the image bearing member with an intermediate transfer member, which is capable of contacting with and separating from the image bearing member, interposed therebetween, wherein the intermediate transfer member is in contact with the image bearing member at the time of executing the metal soap supply operation in the first mode, and the intermediate transfer member is separated from the image bearing member at the time of executing the metal soap supply operation in the second mode.

24. The image forming apparatus according to claim 19, further comprising a transfer member facing the image bearing member with an intermediate transfer member, which is capable of contacting with and separating from the image bearing member, interposed therebetween, wherein a potential difference that is formed between the image bearing member and the transfer member and causes an electrostatic force in a direction from the image bearing member to the transfer member to act on the metal soap is larger at the time of executing the metal soap supply operation in the second mode than at the time of executing the metal soap supply operation in the first mode.

25. The image forming apparatus according to claim 19, further comprising:

a charging member that charges the surface of the image bearing member, and an exposure unit that exposes the surface of the image bearing member on an upstream side of a charged portion formed by the charging member, wherein an exposure amount of the exposure unit is larger at the time of executing the metal soap supply operation in the second mode than at the time of executing the metal soap supply operation in the first mode.

26. The image forming apparatus according to claim 25, wherein the exposure is not performed by the exposure unit at the time of executing the metal soap supply operation in the first mode.

27. An image forming apparatus comprising:

a rotatable image bearing member;

a developing member that supplies a toner to a surface of the image bearing member to form a toner image at a developing portion facing the image bearing member; and a control unit that executes an initial operation of causing the image bearing member to make a transition from a new state to a print-ready state and an image forming operation of forming the toner image on a recording material, wherein a first peripheral speed ratio, which is the ratio of a surface movement speed of the developing member to a surface movement speed of the image bearing member in at least a part of a period of time in which the initial operation is executed, is larger than a second peripheral speed ratio, which is a ratio of the surface movement speed of the developing member to the surface movement speed of the image bearing member at the time of executing the image forming operation, wherein the first peripheral speed ratio is larger than 100%, and wherein the second peripheral speed ratio is not larger than 100%.

28. The image forming apparatus according to claim 27, wherein at the time of executing the initial operation, a potential difference causing an electrostatic force in a direction from a supply member, which supplies the toner to the developing member, toward the developing member to act on the toner is formed between the supply member and the developing member.

29. The image forming apparatus according to claim 27, further comprising a transfer member facing the image bearing member with an intermediate transfer member, which is capable of contacting with and separating from the image bearing member, interposed therebetween, wherein at the time of executing the initial operation, the intermediate transfer member is separated from the image bearing member.

30. The image forming apparatus according to claim 27, further comprising:

a charging member that charges the surface of the image bearing member, and an exposure unit that exposes the surface of the image bearing member on an upstream side of a charged portion formed by the charging member, wherein an exposure amount of the exposure unit is smaller at the time of executing the initial operation than at the time of executing the image forming operation.

31. The image forming apparatus according to claim 30, wherein the exposure is not performed by the exposure unit at the time of executing the initial operation.

32. The image forming apparatus according to claim 27, further comprising a torque detection unit that detects a drive torque of the image bearing member, wherein the control unit makes the first peripheral speed ratio larger than the second peripheral speed ratio in a case where a torque value detected by the torque detection unit at the time of executing the initial operation is at least a fourth threshold value.

33. The image forming apparatus according to claim 27, wherein the toner includes a metal soap having a polarity opposite to that of the toner.

34. The image forming apparatus according to claim 33, wherein the control unit executes an initial supply operation of supplying the metal soap contained in the toner from the developing member to the image bearing member in at least a part of a period of time in which the initial operation is executed.

35. The image forming apparatus according to claim 34, further comprising a supply member that supplies the toner to the developing member, wherein a potential difference that is formed between the supply member and the developing member and causes an electrostatic force in a direction from the supply member to the developing member to act on the metal soap is larger at the time of executing the initial supply operation than at the time of executing the image forming operation.

36. The image forming apparatus according to claim 33, further comprising a transfer member facing the image bearing member with an intermediate transfer member, which is capable of contacting with and separating from the image bearing member, interposed therebetween, wherein a potential difference that is formed between the image bearing member and the transfer member and causes an electrostatic force in a direction from the image bearing member to the transfer member to act on the metal soap is smaller at the time of executing the initial operation than at the time of executing the image forming operation.

37. The image forming apparatus according to claim 36, wherein at the time of executing the initial operation, a voltage applied to the transfer member is 0 V.

38. The image forming apparatus according to claim 27, wherein at the time of executing the initial operation, the developing member comes into contact with the image bearing member at the developing portion.

* * * * *